(12) United States Patent
Shirakawa

(10) Patent No.: US 8,009,083 B2
(45) Date of Patent: Aug. 30, 2011

(54) DETECTION AND RANGING APPARATUS AND METHOD OF DESIGNING DETECTION AND RANGING APPARATUS

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 12/642,469

(22) Filed: Dec. 18, 2009

(65) Prior Publication Data
US 2010/0156701 A1    Jun. 24, 2010

(30) Foreign Application Priority Data
Dec. 19, 2008  (JP) .................. 2008-324368

(51) Int. Cl.
*G01S 13/08* (2006.01)
(52) U.S. Cl. ........................................ 342/118
(58) Field of Classification Search ............. 342/118
See application file for complete search history.

(56) References Cited

U.S. PATENT DOCUMENTS
6,288,672 B1   9/2001  Asano et al.
2006/0066474 A1*  3/2006  Shirakawa .............. 342/147

FOREIGN PATENT DOCUMENTS
JP   2000-155171   6/2000
JP   2006-98181    4/2006

* cited by examiner

*Primary Examiner* — Thomas H. Tarcza
*Assistant Examiner* — Timothy A Brainard
(74) *Attorney, Agent, or Firm* — Staas & Halsey LLP

(57) ABSTRACT

A method of designing a detection and ranging apparatus having an M number of transmitting elements and an N number of receiving elements, includes decomposing a desired polynomial equation representing an array factor of a K element sensor array into a first polynomial equation representing an array factor of an M element sensor array and a second polynomial equation representing an array factor of an N element sensor array, determining arrangement of the M number of transmitting elements based on the first polynomial equation, and determining arrangement the N number of receiving elements based on the second polynomial equation, wherein $K = M \times N$, or $K \geq \max(M, N)$.

16 Claims, 21 Drawing Sheets

FIG.4

| | $V_{R1}: 0$ | $V_{R2}: \phi$ | $V_{R2}: 2\phi$ |
|---|---|---|---|
| $V_{T1}: (0-a)\phi$ | $(0-a)\phi$ | $(1-a)\phi$ | $(2-a)\phi$ |
| $V_{T2}: (2+\beta)\varphi=(3-a)\phi$ | $(3-a)\phi$ | $(4-a)\phi$ | $(5-a)\phi$ |

FIG.6

| | $V_{R1}:0$ | $V_{R2}:2\phi$ | $V_{R2}:4\phi$ |
|---|---|---|---|
| $V_{T1}:-(1+a)\phi$ | $(-1-a)\phi$ | $(1-a)\phi$ | $(3-a)\phi$ |
| $V_{T2}:(0-a)\phi$ | $(0-a)\phi$ | $(2-a)\phi$ | $(4-a)\phi$ |
| $V_{T3}:(5-a)\phi$ | $(5-a)\phi$ | $(7-a)\phi$ | $(9-a)\phi$ |
| $V_{T4}:(6-a)\phi$ | $(6-a)\phi$ | $(8-a)\phi$ | $(10-a)\phi$ |

FIG.8

| | $V_{R1}: -(3+\alpha)\phi$ | $V_{R2}: (0-\alpha)\phi$ | $V_{R3}: (3-\alpha)\phi$ | $V_{R4}: (6-\alpha)\phi$ |
|---|---|---|---|---|
| $V_{T1}: 0$ | $-(3+\alpha)\phi$ | $(0-\alpha)\phi$ | $(3-\alpha)\phi$ | $(6-\alpha)\phi$ |
| $V_{T2}: \phi$ | $-(2+\alpha)\phi$ | $(1-\alpha)\phi$ | $(4-\alpha)\phi$ | $(7-\alpha)\phi$ |
| $V_{T3}: 2\phi$ | $-(1+\alpha)\phi$ | $(2-\alpha)\phi$ | $(5-\alpha)\phi$ | $(8-\alpha)\phi$ |

FIG.10

| | $V_{R1}:-3\phi$ | $V_{R2}:0$ | $V_{R3}:3\phi$ | $V_{R4}:6\phi$ |
|---|---|---|---|---|
| $V_{T1}:(0-\alpha)\phi$ | $-(3+\alpha)\phi$ | $(0-\alpha)\phi$ | $(3-\alpha)\phi$ | $(6-\alpha)\phi$ |
| $V_{T2}:(1-\alpha)\phi$ | $-(2+\alpha)\phi$ | $(1-\alpha)\phi$ | $(4-\alpha)\phi$ | $(7-\alpha)\phi$ |
| $V_{T3}:(2-\alpha)\phi$ | $-(1+\alpha)\phi$ | $(2-\alpha)\phi$ | $(5-\alpha)\phi$ | $(8-\alpha)\phi$ |

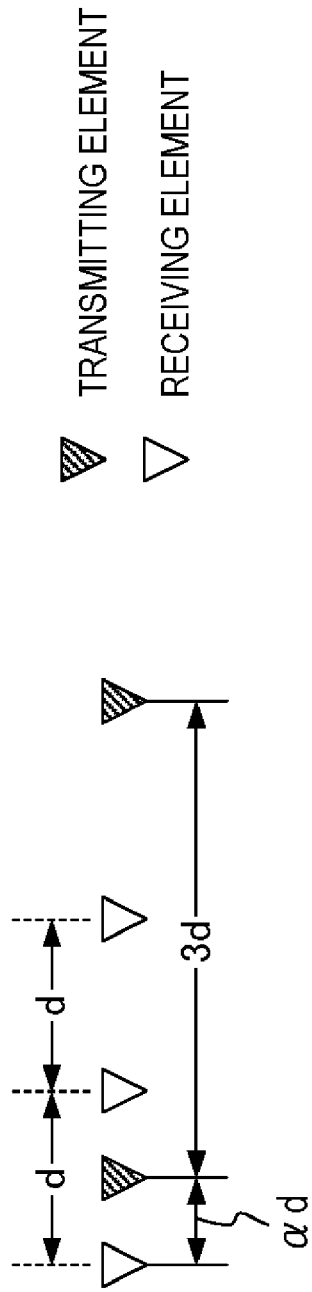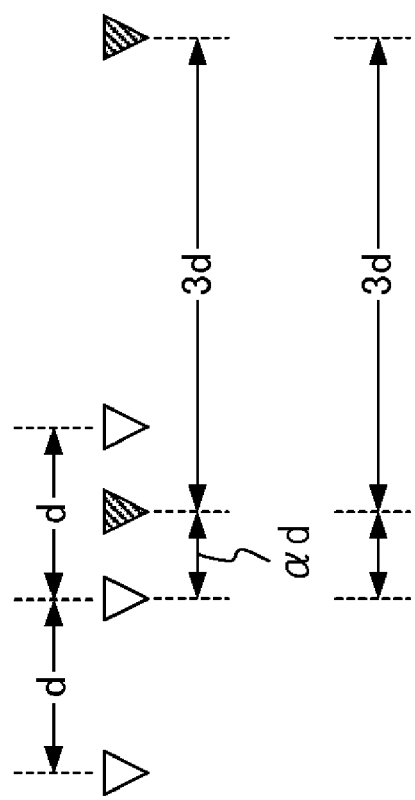

array factor polynomial of TX array antenna (O) : $_rT_p(z)=1+z+z^2$
array factor polynomial of RX array antenna (X) : $_sT_p(z)=1+z^3+z^6+z^9$

FIG.15

| | $V_{R1}: 0$ | $V_{R2}: \phi$ | $V_{R3}: 2\phi$ |
|---|---|---|---|
| $V_{T1}: -\phi$ | $-\phi$ | 0 | $\phi$ |
| $V_{T2}: 2\phi$ | $2\phi$ | $3\phi$ | $4\phi$ |

FIG.17

| | $V_{R1}:0$ | $V_{R2}:\phi$ | $V_{R3}:2\phi$ |
|---|---|---|---|
| $V_{T1}:-\phi$ | $-\phi$ | 0 | $\phi$ |
| $V_{T2}:0$ | 0 | $\phi$ | $2\phi$ |
| $V_{T3}:\phi$ | $\phi$ | $2\phi$ | $3\phi$ |
| $V_{T4}:2\phi$ | $2\phi$ | $3\phi$ | $4\phi$ |

FIG.21

| | $V_{R1}:0$ | $V_{R2}:3\phi$ | $V_{R3}:6\phi$ | $V_{R4}:9\phi$ | $V_{R5}:12\phi$ |
|---|---|---|---|---|---|
| $W_{T1}:-\phi$ | $-\phi$ | $2\phi$ | $5\phi$ | $8\phi$ | $11\phi$ |
| $W_{T2}:0$ | 0 | $3\phi$ | $6\phi$ | $9\phi$ | $12\phi$ |
| $W_{T3}:\phi$ | $\phi$ | $4\phi$ | $7\phi$ | $10\phi$ | $13\phi$ |

DETECTION AND RANGING APPARATUS AND METHOD OF DESIGNING DETECTION AND RANGING APPARATUS

CROSS-REFERENCE TO RELATED APPLICATION

This application is based upon and claims the benefit of priority of the prior Japanese Patent Application No. 2008-324368, filed on Dec. 19, 2008, the entire contents of which are incorporated herein by reference.

FIELD

Embodiments of the present invention relate to a detection and ranging apparatus and a method of designing the detection and ranging apparatus. Examples of the detection and ranging apparatus include a detection and ranging apparatus estimating a direction in which an object is located using a plurality of sensor elements.

BACKGROUND

Conventionally, there has been known a detection and ranging apparatus estimating a relative distance in a visual-line direction, a relative speed in a visual-line direction, and a direction (hereinafter referred to simply as a distance, a speed, a direction, or collectively as object specifications) between the apparatus and an object using radio waves (e.g., millimeter waves), acoustic waves, or light. According to such a detection and ranging apparatus, a probe signal is radiated toward a detection region covered by the apparatus. If an object exists in the region, the probe signal is reflected by the object to generate an echo signal. Then, the apparatus analyzes the echo signal to estimate the direction, the distance, the speed, and the like of the object. Of them, regarding the direction of the object, there is a detection and ranging apparatus, where a plurality of sensor elements are spaced at an appropriate distance apart, and estimation is made based on the phase of the echo signal received by each sensor element, the distance between the sensor elements, and the like.

In general, it is desirable that the detection and ranging apparatus having the above described functions should include a large number of sensor elements to detect the object with a good accuracy. However, for example, when the apparatus is to be mounted in a vehicle, the apparatus needs to solve a tradeoff between mounting a large number of sensors and keeping the apparatus compact. In light of this, a configuration for addressing the tradeoff has been proposed.

For example, holographic radar uses an oscillator to generate high-frequency signals which are transmitted as probe signals via a plurality of transmitting antennas. The probe signals are reflected by the objects to generate echo signals which are received by a plurality of receiving antennas (see Japanese Patent Laid-Open No. 2000-155171). Then, signal processing is performed on the obtained plurality of receiving signals to detect the objects. The above configuration uses time-division multiplexing to appropriately switch each of a plurality of transmitting antennas and a plurality of receiving antennas. Thereby, the same characteristics as those for the configuration of increasing the number of receiving antennas may be obtained.

Alternatively, for example, according to a radar apparatus having an N number of antenna elements, one of the N number of antenna elements disposed at the outermost periphery of an antenna array is alternately used as a transmitting antenna and the remaining N−1 number of antenna elements are used as the receiving antennas (see Japanese Patent Laid-Open No. 2006-98181). Thereby, the number of effective receiving antennas may increase to double the number of physical (i.e., actual) receiving antennas.

The performance and the size of the detection and ranging apparatus depend on the number of sensor elements (or antenna elements) and the arrangement. However, there has not been known a conventional method of implementing a design satisfying the required performance and/or size with a logical consistency. More specifically, conventionally, the number of transmitting sensors and receiving sensors and the arrangement thereof are determined by trial and error by considering each individual case separately. As a result, it is sometimes understood after an experimental device was made that the desired characteristics could not be achieved. It took a lot of effort to implement an appropriate design.

In addition, the aforementioned configuration includes a switch circuit for switching between the transmitting antennas and/or the receiving antennas. This switch circuit attenuates signals and thus may deteriorate estimation accuracy of the object specifications, namely, detection accuracy.

SUMMARY

According to an aspect of the embodiments discussed herein, a method of designing a detection and ranging apparatus having an M number of transmitting elements and an N number of receiving elements, includes decomposing a desired polynomial equation representing an array factor of a K element sensor array into a first polynomial equation representing an array factor of an M element sensor array and a second polynomial equation representing an array factor of an N element sensor array, determining arrangement of the M number of transmitting elements based on the first polynomial equation, and determining arrangement the N number of receiving elements based on the second polynomial equation, wherein K=M×N.

It is to be understood that both the foregoing general description and the following detailed description are exemplary and explanatory and are not restrictive of the embodiments, as claimed.

BRIEF DESCRIPTION OF DRAWINGS

FIG. 4 illustrates a phase state provided in the first embodiment illustrated in FIG. 3;

FIG. 6 illustrates a phase state provided in the second embodiment;

FIG. 8 illustrates a phase state provided in the third embodiment;

FIG. 10 illustrates a phase state provided in the fourth embodiment;

FIGS. 11A and 11B explain element arrangement;

FIG. 15 illustrates a phase state provided in the configuration illustrated in FIG. 14;

FIG. 17 illustrates a phase state provided in the configuration illustrated in FIG. 16;

FIG. 21 illustrates a phase state provided by the MIMO system illustrated in FIG. 20.

DESCRIPTION OF EMBODIMENTS

Figure 1:
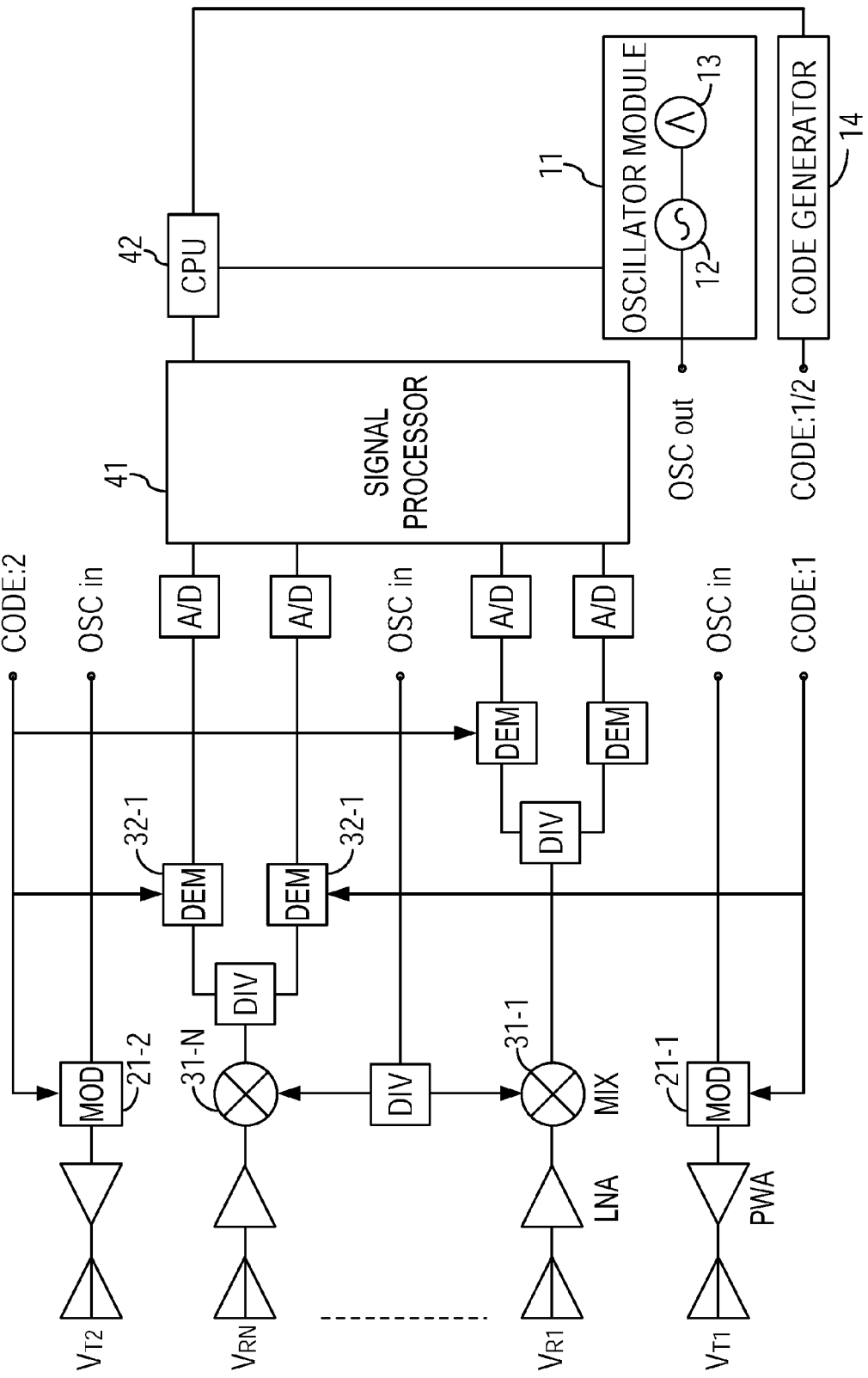
FIG. 1 illustrates a configuration of a detection and ranging apparatus in accordance with an embodiment.

FIG. 1 illustrates a radar apparatus as a specific configuration example of a circuit portion of a detection and ranging apparatus in accordance with an embodiment. This detection and ranging apparatus has a plurality of transmitting elements $V_{T1}$ and $V_{T2}$ and a plurality of receiving elements $V_{R1}$ to $V_{RN}$. Note that FIG. 1 illustrates a configuration having two transmitting elements, but the detection and ranging apparatus in accordance with an embodiment may have any number of transmitting elements.

Figure 2:
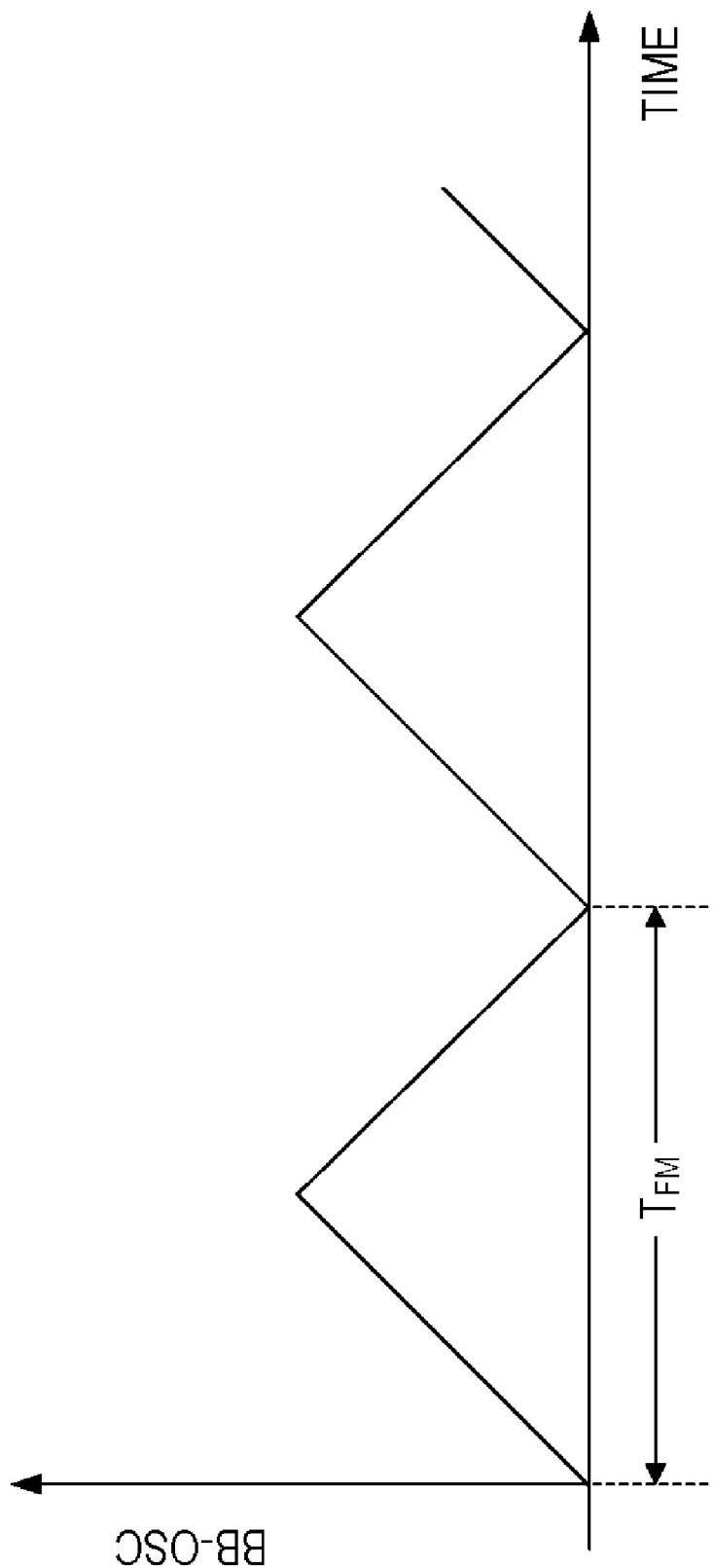
FIG. 2 illustrates an example of an input signal for modulating an RF-VCO.

An oscillator module 11 includes a radio frequency voltage controlled oscillator (RF-VCO) 12 and a modulation input signal generator (e.g., baseband oscillator (BB-OSC)) 13 applying voltage to the radio frequency voltage controlled oscillator 12. The output signal from the radio frequency voltage controlled oscillator 12 is a high-frequency signal having an instantaneous frequency controlled by an input signal from the modulation input signal generator 13. Note that if the output from the modulation input signal generator 13 is a direct-current voltage value, the instantaneous frequency is a fixed value. The modulation input signal generated by the modulation input signal generator 13 is a waveform varying cyclically in a cycle $T_{FM}$ as illustrated in FIG. 2. Then, the oscillator module 11 outputs an oscillator signal modulated by the modulation input signal, for example, an oscillator signal modulated primarily by a frequency modulation system (hereinafter may be referred to as a system oscillator source).

A code generator 14 generates mutually orthogonal diffusion codes 1 and 2. Modulators (MOD) 21-1 and 21-2 use corresponding diffusion codes to perform secondary modulation on the system oscillation source by a direct sequence spread spectrum system. The signal generated in this manner (which hereinafter may be referred to as a radar signal) is power-amplified by a power amplifier (PWA) and is radiated through the transmitting elements (antennas) $V_{T1}$ and $V_{T2}$. Note that in the following description, a radio wave radiated through a transmitting element may be referred to as a probe signal.

Each of the receiving elements (antennas) $V_{R1}$ to $V_{RN}$ receives an echo signal. The echo signal is a radio wave generated by a probe signal being transmitted through each transmitting element and then being reflected by an object. Each echo signal received by each receiving element is amplified by a low noise amplifier (LNA), and then mixers (MIX) 31-1 to 31-N mix the echo signal with the system oscillator source to be RF-demodulated (primary demodulation). Further, demodulators (DEM) 32-1 and 32-2 use the diffusion codes 1 and 2 to perform despreading (secondary demodulation) to extract a baseband component corresponding to each transmitting element for each receiving element. The extracted baseband component of the echo signal is converted to a digital signal.

A signal processor 41 uses the baseband component of the echo signal obtained by each receiving element to calculate at least one of the object specifications (the relative distance in a visual-line direction between the apparatus and the object, the relative speed of the object in a visual-line direction with respect to the apparatus, and the angle θ measured from an appropriately set baseline with respect to the apparatus). A CPU 42 controls the operation of the detection and ranging apparatus. Note that the signal processor 41 and the CPU 42 may cooperatively calculate the distance, the speed, and the angle. Hereinafter, unless ambiguous, the echo signal and the baseband signal (component) obtained by demodulation thereof are treated as the same.

Figure 3:
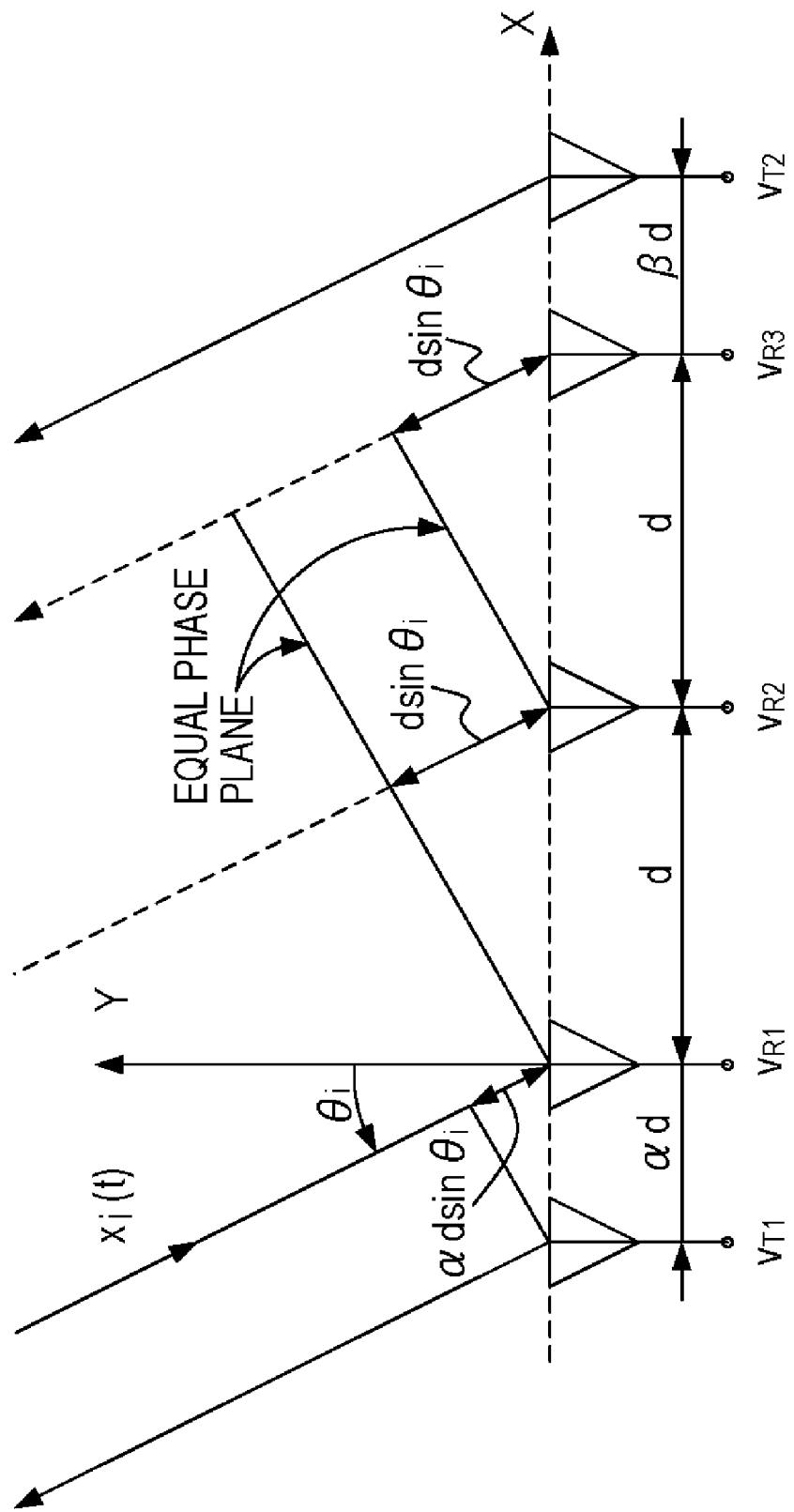
FIG. 3 illustrates a first embodiment of the detection and ranging apparatus.

FIG. 3 illustrates a first embodiment of the detection and ranging apparatus in accordance with the present invention. The detection and ranging apparatus of the first embodiment includes two transmitting elements $V_{T1}$ and $V_{T2}$, and three receiving elements $V_{R1}$ to $V_{R3}$. Each of the sensor elements (the transmitting elements $V_{T1}$ and $V_{T2}$, and the receiving elements $V_{R1}$ to $V_{R3}$) is arranged along the X-axis of Cartesian coordinates. More specifically, a sensor array is made up of the transmitting elements $V_{T1}$ and $V_{T2}$, and the receiving elements $V_{R1}$ to $V_{R3}$. Note that the two transmitting elements $V_{T1}$ and $V_{T2}$ form a TX sensor array, and the three receiving elements $V_{R1}$ to $V_{R3}$ form an RX sensor array (the case where M=1 or N=1 may be considered to be a special case of the sensor array).

First, assuming that the detection and ranging apparatus is a radar device, an individual sensor element is an antenna element. A transceiver circuit is connected to each antenna element used as the transmitting element. A receiver circuit is connected to each antenna element used as the receiving element. As a specific configuration of the transceiver/receiver circuit, for example, the case of N=3 in FIG. 1 may be considered.

In FIG. 3, the receiving elements $V_{R1}$ to $V_{R3}$ are spaced at an equal distances d apart in series. The value of "d" is determined by the wavelength λ of a carrier signal conveying a probe signal and an echo signal, the total number of equivalent sensors of a combined sensor array made of both transmitting and receiving sensor arrays, and a maximum measurement angle range to be covered by the combined sensor array (the wavelength λ of an ultra wideband (UWB) signal such as a UWB system should be considered as a wavelength corresponding to the frequency at the center of an available band).

The transmitting element $V_{T1}$ is located outside the RX sensor array and spaced a distance αd away from the receiving element $V_{R1}$. In addition, the transmitting element $V_{T2}$ is located outside the RX sensor array and spaced a distance βd away from the receiving element $V_{R3}$. Here, the parameters α and β should satisfy the constraint condition: "α+β=1". Note that the parameters α and β are not particularly limited, but may be such that "α=β=0.5". Alternatively, the parameters α and β may be different from each other.

Next, the description will focus on a method of estimating the direction in which an object is located using the above configured detection and ranging apparatus. Here, assume that an I number of objects (targets to be detected) exist independently from each other in a detection range. Further, the objects i (=1, 2, ..., I) are located in a direction at an angle of $θ_i$. Note that in FIG. 3, the angle of θ assumes that the positive direction of the Y axis is zero degrees and an angle in the clockwise direction is the positive direction. In addition, when an echo signal (reflected wave) from an object is received by each of the receiving elements $V_{R1}$ to $V_{R3}$, the individual echo signals are assumed to arrive at the receiving elements $V_{R1}$ to $V_{R3}$ in a propagation direction parallel to each other (that is, the relative distance between each object and the apparatus is sufficiently large enough with respect to a wavelength of λ to make a plane wave approximation).

Here, the propagation distance from the object i to the receiving element $V_{R1}$ is longer by d sin $\theta_i$ than the propagation distance from the object i to the receiving element $V_{R2}$. In addition, based on the position where the receiving element $V_{R1}$ is located, the receiving element $V_{R2}$ is located a distance d away in the positive direction along the X axis. That is, if the spatial phase of the echo signal from the object i ($\in \forall$I) received by the receiving element $V_{R1}$ (hereinafter referred to simply as the spatial phase of the receiving element $V_{R1}$, or the like) is assumed to have a zero spatial phase, the spatial phase of the receiving element $V_{R2}$ is "$-2\pi(d/\lambda) \sin \theta_i$". Consequently, the spatial phase of the receiving element $V_{R2}$ may be defined as the phase φ in the following expression (1). Note that in order to simplify the description of phase relationship, unless ambiguous, the identifier i of an object related to φ is omitted.

$$\phi = -\frac{2\pi}{\lambda} d \sin(\theta_i) \quad (1)$$

Likewise, the spatial phase of the receiving element $V_{R3}$ is "2φ". Here, when the receiving element $V_{R1}$ is set to a base position, the transmitting element $V_{T1}$ is located a distance ad away in the negative direction along the X axis. Therefore, the spatial phase of the probe signal radiated from the transmitting element $V_{T1}$ toward the objects i($\in \forall$I) (hereinafter referred to simply as the spatial phase of the transmitting element $V_{T1}$, or the like) is "−αφ".

When the spatial phase of the individual element is defined as described above, the mixed phase obtained by a combination of the transmitting element $V_{T1}$ and the receiving element $V_{R1}$ is "(0−α)φ". In addition, the mixed phase obtained by a combination of the transmitting element $V_{T1}$ and the receiving element $V_{R2}$ is "(1−α)φ", and the mixed phase obtained by a combination of the transmitting element $V_{T1}$ and the receiving element $V_{R3}$ is "(2−α)φ". Note that hereinafter, the mixed phase obtained by a combination of the transmitting element $V_{T1}$ and the receiving element $V_{R1}$ is referred to as "mixed phase $V_{T1}/V_{R1}$". This convention applies to other combinations.

On the other hand, the distance between the transmitting element $V_{T2}$ and the receiving element $V_{R3}$ is βd. When the position of the receiving element $V_{R1}$ is set to the base position, the transmitting element $V_{T2}$ is located a distance (2+β)d away in the positive direction along the X axis. Consequently, the spatial phase of the transmitting element $V_{T2}$ is "(2+β)φ". Here, when the constraint condition "α+β=1" is introduced, the spatial phase of the transmitting element $V_{T2}$ is expressed as "(2+(1−α))φ=(3−α)φ". Consequently, the mixed phase $V_{T2}/V_{R1}$ is "(3−α)φ". Likewise, the mixed phase $V_{T2}/V_{R2}$ is "(4−α)φ", and the mixed phase $V_{T2}/V_{R3}$ is "(5−α)φ".

FIG. 4 illustrates, as a table, the mixed phases obtained by a combination of the transmitting elements $V_{T1}$ and $V_{T2}$ and the receiving elements $V_{R1}$ to $V_{R3}$ as described above. As listed in the table, the detection and ranging apparatus of the first embodiment may receive six echo signals each of whose spatial phase is different from each other for each object using two transmitting elements and three receiving elements. That is, generally, if a configuration has an M number of transmitting elements and an N number of receiving elements, the configuration may obtain M×N number of pieces of mutually different phase information per object.

Here, if a configuration having the aforementioned constraint condition of "α+β=1" is used, six spatial phases "(0−α)φ" to "(5−α)φ", each of which is shifted by "φ" in the example of FIG. 3, are obtained. Likewise, generally, the configuration may provide a detection and ranging apparatus equivalent to a configuration having an antenna array with a distance d between antennas and an M×N number of equally spaced elements as receiving antennas.

Moreover, according to the detection and ranging apparatus illustrated in FIG. 3, a physical aperture (the distance between elements disposed at the outermost periphery, in this case, the distance between $V_{T1}$ and $V_{T2}$) of the sensor array is 3d, but an effective aperture (effective number of receiving antennas) is (2×3)d=6d, which indicates that the apparatus may be made more compact.

Further, the detection and ranging apparatus of the first embodiment does not have a switch for switching the sensor elements by time-division multiplexing. Therefore, signals are less attenuated in the circuit and detection accuracy is improved compared to the configurations disclosed in Japanese Patent Laid-Open No. 2000-155171 and Japanese Patent Laid-Open No. 2006-98181 as described above.

It should be noted that an appropriate well-known technique is used to calculate an object angle of θ based on a plurality of (six in the example illustrated in FIG. 3) spatial phases of echo signals. For example, a beamformer method is used to estimate the direction (object angle θ) in which an echo signal arrives. It is the signal processor 41 (signal processor 41 and CPU 42) illustrated in FIG. 1 that estimates the direction in which the echo signal arrives. Moreover, generally, the number of detectable objects depends on the number of effective elements making up the sensor array. In other words, according to the detection and ranging apparatus of the first embodiment, the number of detectable objects may be increased without increasing the size of the apparatus.

The aforementioned operation is expressed by a numerical expression. First, assuming that an I number of mutually independent objects exist in a detection range of the apparatus, a probe signal radiated from the transmitting element $V_{T1}$ (transmitting antenna 1) is reflected by an i-th object (object i) to generate an echo signal, which is received by a k-th receiving element (receiving antenna k). When, the echo signal is appropriately demodulated according to the system's modulation method, a baseband signal $x_i(t)$ is obtained which has a spatial phase of $\phi_i^{1,k}$ expressed by the following expression (2) as an observation signal with respect to the object i.

$$\phi_i^{1,k} = -\frac{2\pi}{\lambda}(-\alpha + k - 1)d\sin(\theta_i) \quad (2)$$

Here, an assumption has been made that an I number of objects exist in a detection range of the apparatus, and consequently the baseband signal of $v^1_{Rk}(t)$, which is obtained by a combination of the transmitting antenna 1 and the receiving antenna k is as the expression (3). Note that $n_k(t)$ is a noise component added to the signal component of the receiving antenna k.

$$v_{Rk}^1(t) = \sum_{i=1}^{I} x_i(t)\exp(j\phi_i^{1,k}) + n_k(t) \quad (3)$$

Likewise, a probe signal radiated from the transmitting element $V_{T2}$ (transmitting antenna 2) is reflected by the object i to generate an echo signal, which is received by the receiving antenna k. When, the echo signal is demodulated to obtain the baseband signal of $x_i(t)$, the spatial phase of $\phi_i^{2,k}$ may be expressed by the following expression (4).

$$\phi_i^{2,k} = -\frac{2\pi}{\lambda}(N - \alpha + k - 1)d\sin(\theta_i) \quad (4)$$

Consequently the baseband signal of $v_{Rk}^2(t)$, which is obtained by a combination of the transmitting antenna 2 and the receiving antenna k is as the expression (5).

$$v_{Rk}^2(t) = \sum_{i=1}^{I} x_i(t)\exp(j\phi_i^{2,k}) + n_k(t) \quad (5)$$

Therefore, an extended signal vector specified by the expression (6) is used to perform aperture synthesis. Consequently, an N element receiving sensor array is extended substantially to an M×N element receiving sensor array. Note that in the expression (6), M=2.

$$v(t)=[v_{R1}^1(t), \ldots, v_{RN}^1(t)|v_{R1}^2(t), \ldots, v_{RN}^2(t)]^T = [v^1(t)|v^2(t)]^T \quad (6)$$

The method of increasing the number of effective elements of the receiving sensor array by a combination of the transmitting sensor array and the receiving sensor array may be called a holographic method. That is, according to the configuration of the first embodiment, the holographic method may be used to make the detection and ranging apparatus compact without using time-division multiplexing. It should be noted that a configuration of operating the detection and ranging apparatus by time-division multiplexing may be introduced as the detection method of the first embodiment.

Note that the detection and ranging apparatus of the first embodiment uses a well known technique such as a method of performing Fourier transform on the frequency modulation component of the probe signal (thus, of the echo signal) to calculate the distance to the object and the speed of the object. In the first embodiment of FIG. 1, this frequency modulation component is generated by the oscillator module 11.

Figure 5:
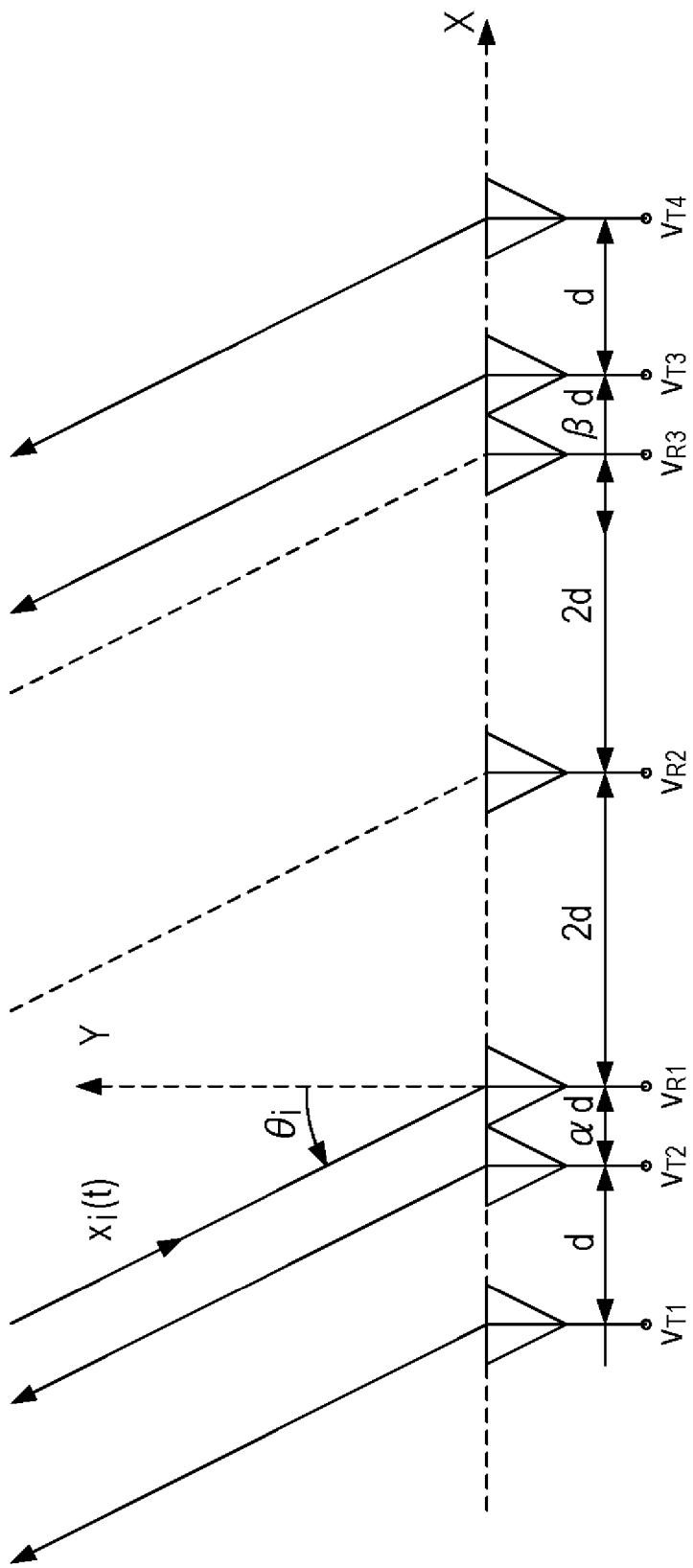
FIG. 5 illustrates a configuration of a second embodiment.

FIG. 5 illustrates a second embodiment of the detection and ranging apparatus in accordance with the present invention. The detection and ranging apparatus of the second embodiment has four transmitting elements $V_{T1}$ to $V_{T4}$ and three receiving elements $V_{R1}$ to $V_{R3}$. The meanings of the coordinates and the like illustrated in FIG. 5 are the same as those in the first embodiment.

In FIG. 5, the receiving elements $V_{R1}$ to $V_{R3}$ are spaced apart at an equal distance 2d. The transmitting elements $V_{T1}$ to $V_{T4}$ are divided into two groups: ($V_{T1}$ and $V_{T2}$) and ($V_{T3}$ and $V_{T4}$). The group of the transmitting elements ($V_{T1}$ and $V_{T2}$) is located on the negative side of the X axis with respect to the receiving elements $V_{R1}$ to $V_{R3}$. The distance between the transmitting elements $V_{T1}$ and $V_{T2}$ is d, and the distance between the transmitting element $V_{T2}$ and the receiving element $V_{R1}$ is $\alpha$d. The group of the transmitting elements ($V_{T3}$ and $V_{T4}$) is located on the positive side of the X axis with respect to the receiving elements $V_{R1}$ to $V_{R3}$. The distance between the transmitting elements $V_{T3}$ and $V_{T4}$ is d, and the distance between the transmitting element $V_{T3}$ and the receiving element $V_{R3}$ is $\beta$d.

First, considering the phase relation of the case where $V_{T1}$ and $V_{T2}$ are used as transmitting elements, the distance between the transmitting element $V_{T1}$ and the receiving element $V_{R1}$ is $(1+\alpha)$d. Therefore, when the receiving element $V_{R1}$ is used as the base (zero spatial phase), the spatial phase of the transmitting element $V_{T1}$ is "$-(1+\alpha)\phi$". Consequently, the mixed phase $V_{T1}/V_{R1}$ is "$(-1-\alpha)\phi$". In addition, the spatial phase of the receiving element $V_{R2}$ is "$2\phi$", and the spatial phase of the receiving element $V_{R3}$ is "$4\phi$". Consequently, the mixed phase $V_{T1}/V_{R2}$ is "$(1-\alpha)\phi$", and the mixed phase $V_{T1}/V_{R3}$ is "$(3-\alpha)\phi$".

Likewise, the distance between the transmitting element $V_{T2}$ and the receiving element $V_{R1}$ is $\alpha$d. Based on the receiving element $V_{R1}$, the spatial phase of the transmitting element $V_{T2}$ is "$-\alpha\phi$". Consequently, the mixed phase $V_{T2}/V_{R1}$ is "$(0-\alpha)\phi$", the mixed phase $V_{T2}/V_{R2}$ is "$(2-\alpha)\phi$", and the mixed phase $V_{T2}/V_{R3}$ is "$(4-\alpha)\phi$".

Next, considering the phase relation of the case where ($V_{T3}$ and $V_{T4}$) are used as transmitting elements, the distance between the transmitting element $V_{T3}$ and the receiving element $V_{R1}$ is $(4+\beta)$d. Here, when the constraint condition "$\alpha+\beta=1$" is introduced, the distance between the transmitting element $V_{T3}$ and the receiving element $V_{R1}$ may be expressed as $(5-\alpha)$d. Consequently, the spatial phase of the transmitting element $V_{T3}$ is "$(5-\alpha)\phi$". That is, the mixed phase $V_{T3}/V_{R1}$ is "$(5-\alpha)\phi$", the mixed phase $V_{T3}/V_{R2}$ is "$(7-\alpha)\phi$", and the mixed phase $V_{T3}/V_{R3}$ is "$(9-\alpha)\phi$". Likewise, from the combination of the transmitting element $V_{T4}$ and the receiving elements $V_{R1}$, $V_{R2}$, and $V_{R3}$, the mixed phases "$(6-\alpha)\phi$", "$(8-\alpha)\phi$", and "$(10-\alpha)\phi$" are obtained.

FIG. 6 illustrates, as a table, the mixed phases provided in the second embodiment illustrated in FIG. 5. As listed in the table, the detection and ranging apparatus of the second embodiment may receive 3×4=12 echo signals each of whose spatial phase is different from each other for each object by using four transmitting elements and three receiving elements. Here, the spatial phases of the 12 echo signals are "$(-1-\alpha)\phi$" to "$(10-\alpha)\phi$" respectively, with each spatial phase being shifted by an equal amount of phase $\phi$. Therefore, the configuration may provide a detection and ranging apparatus equivalent to a configuration where 12 receiving elements are spaced apart at an equal distance of d. Note that the physical aperture of the sensor in accordance with the second embodiment is 7d.

Figure 7:
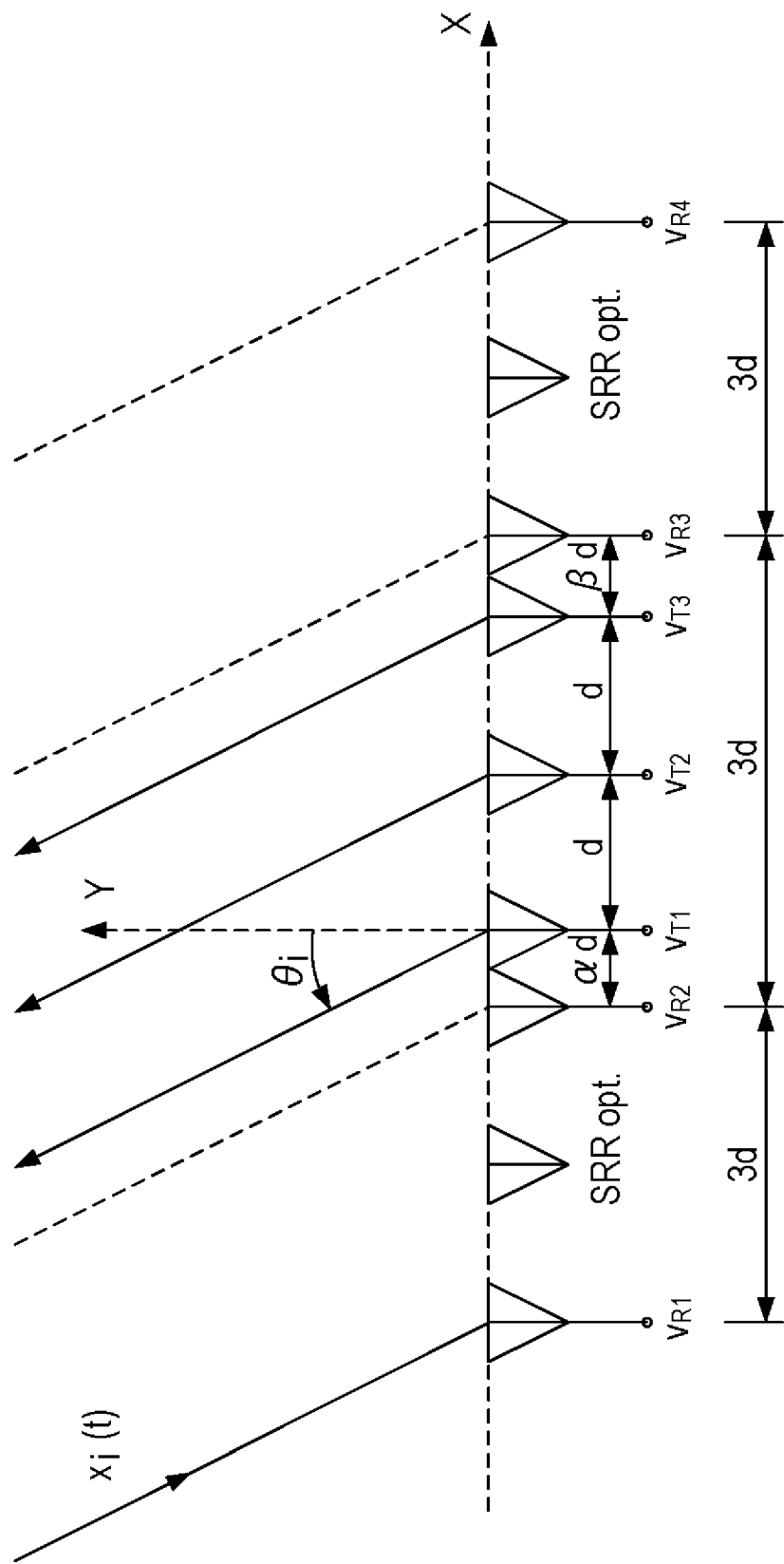
FIG. 7 illustrates a configuration of a third embodiment.

FIG. 7 illustrates a third embodiment of the detection and ranging apparatus in accordance with the present invention. The detection and ranging apparatus of the third embodiment has three transmitting elements $V_{T1}$ to $V_{T3}$, and four receiving elements $V_{R1}$ to $V_{R4}$.

In FIG. 7, the transmitting elements $V_{T1}$ to $V_{T3}$ are spaced apart at an equal distance of d. The receiving elements $V_{R1}$ to $V_{R4}$ are divided into two groups: ($V_{R1}$ and $V_{R2}$) and ($V_{R3}$ and $V_{R4}$). The group of the receiving elements ($V_{R1}$ and $V_{R2}$) is located on the negative side of the X axis with respect to the transmitting elements $V_{T1}$ to $V_{T3}$. The distance between the receiving elements $V_{R1}$ and $V_{R2}$ is 3d, and the distance between the receiving element $V_{R2}$ and the transmitting element $V_{T1}$ is $\alpha$d. The group of the receiving elements ($V_{R3}$ and $V_{R4}$) is located on the positive side of the X axis with respect to the transmitting elements $V_{T1}$ to $V_{T3}$. The distance between the receiving elements $V_{R3}$ and $V_{R4}$ is 3d, and the distance between the receiving element $V_{R3}$ and the transmitting element $V_{T3}$ is $\beta$d. Note that the distance between the receiving elements $V_{R2}$ and $V_{R3}$ is 3d.

First, looking at the transmitting element $V_{T1}$, the distance between the transmitting element $V_{T1}$ and the receiving elements $V_{R1}$, $V_{R2}$, $V_{R3}$, and $V_{R4}$ is $(3+\alpha)$d, $\alpha$d, $(2+\beta)$d, and $(5+\beta)$d respectively. When the constraint condition "$\alpha+\beta=1$" is introduced, the distance between the transmitting element $V_{T1}$ and the receiving elements $V_{R3}$ and $V_{R4}$ may be expressed as $(3-\alpha)$d and $(6-\alpha)$d, respectively. Here, when the position of the transmitting element $V_{T1}$ is set to the X-axis coordinate base (zero), the receiving elements $V_{R1}$ and $V_{R2}$ are located on the negative side of the X axis, and the receiving elements $V_{R3}$ and $V_{R4}$ are located on the positive side of the X axis. Therefore, when the transmitting element $V_{T1}$ is set to the base (zero spatial phase), the spatial phases of the receiving elements $V_{R1}$, $V_{R2}$, $V_{R3}$, and $V_{R4}$ are "$-(3+\alpha)\phi$", "$-\alpha\phi$", "$(3-\alpha)\phi$", and "$(6-\alpha)\phi$", respectively. Thus, from the combination of the transmitting element $V_{T1}$ and the receiving elements $V_{R1}$, $V_{R2}$, $V_{R3}$, and $V_{R4}$, the mixed phases "$(-3-\alpha)\phi$", "$(0-\alpha)\phi$", "$(3-\alpha)\phi$", and "$(6-\alpha)\phi$" respectively are obtained.

Next, looking at the transmitting element $V_{T2}$, the transmitting element $V_{T2}$ is located a distance d away from the transmitting element $V_{T1}$. Consequently, based on $V_{T1}$, the spatial phase of the transmitting element $V_{T2}$ is "$\phi$". Therefore, from the combination of the transmitting element $V_{T2}$ and the receiving elements $V_{R1}$, $V_{R2}$, $V_{R3}$, and $V_{R4}$, the mixed phases "$(-2-\alpha)\phi$", "$(1-\alpha)\phi$", "$(4-\alpha)\phi$", and "$(7-\alpha)\phi$" respectively are obtained.

Finally, looking at the transmitting element $V_{T3}$, the transmitting element $V_{T3}$ is located a distance 2d away from the transmitting element $V_{T1}$. Consequently, based on $V_{T1}$, the spatial phase of the transmitting element $V_{T3}$ is "$2\phi$". Therefore, from the combination of the transmitting element $V_{T3}$ and the receiving elements $V_{R1}$, $V_{R2}$, $V_{R3}$, and $V_{R4}$, the mixed phases "$(-1-\alpha)\phi$", "$(2-\alpha)\phi$", "$(5-\alpha)\phi$", and "$(8-\alpha)\phi$" respectively are obtained.

FIG. 8 illustrates, as a table, the mixed phases provided in the third embodiment illustrated in FIG. 7. As listed in the table, the detection and ranging apparatus of the third embodiment may receive 3×4=12 echo signals each of whose spatial phases are different from each other for each object using three transmitting elements and four receiving elements. Here, the spatial phases of the 12 echo signals are "$(-3-\alpha)\phi$" to "$(8-\alpha)\phi$" respectively, with each spatial phase being shifted by an equal amount of $\phi$. Therefore, the configuration may provide a detection and ranging apparatus equivalent to a configuration where 12 receiving elements are spaced apart at an equal distance of d. Note that the physical aperture of the sensor in accordance with the third embodiment is 9d.

The third embodiment illustrated in FIG. 7 uses a wide open space provided between the receiving element $V_{R1}$ and the receiving element $V_{R2}$, and between the receiving element $V_{R3}$ and the receiving element $V_{R4}$ to provide an auxiliary sensor element (SRR opt) in each space. These auxiliary sensor elements are used independently or by an appropriate combination of the receiving elements $V_{R1}$ to $V_{R4}$, for example, to install a short range radar function in the apparatus. In this manner, an auxiliary sensor element may be provided in a region where the distance between sensor elements is wider than the standard distance of d. Note that the auxiliary sensor may be a transmitting sensor. In this case, the auxiliary sensor may be used to calibrate a sensor array, or the like.

Figure 9:
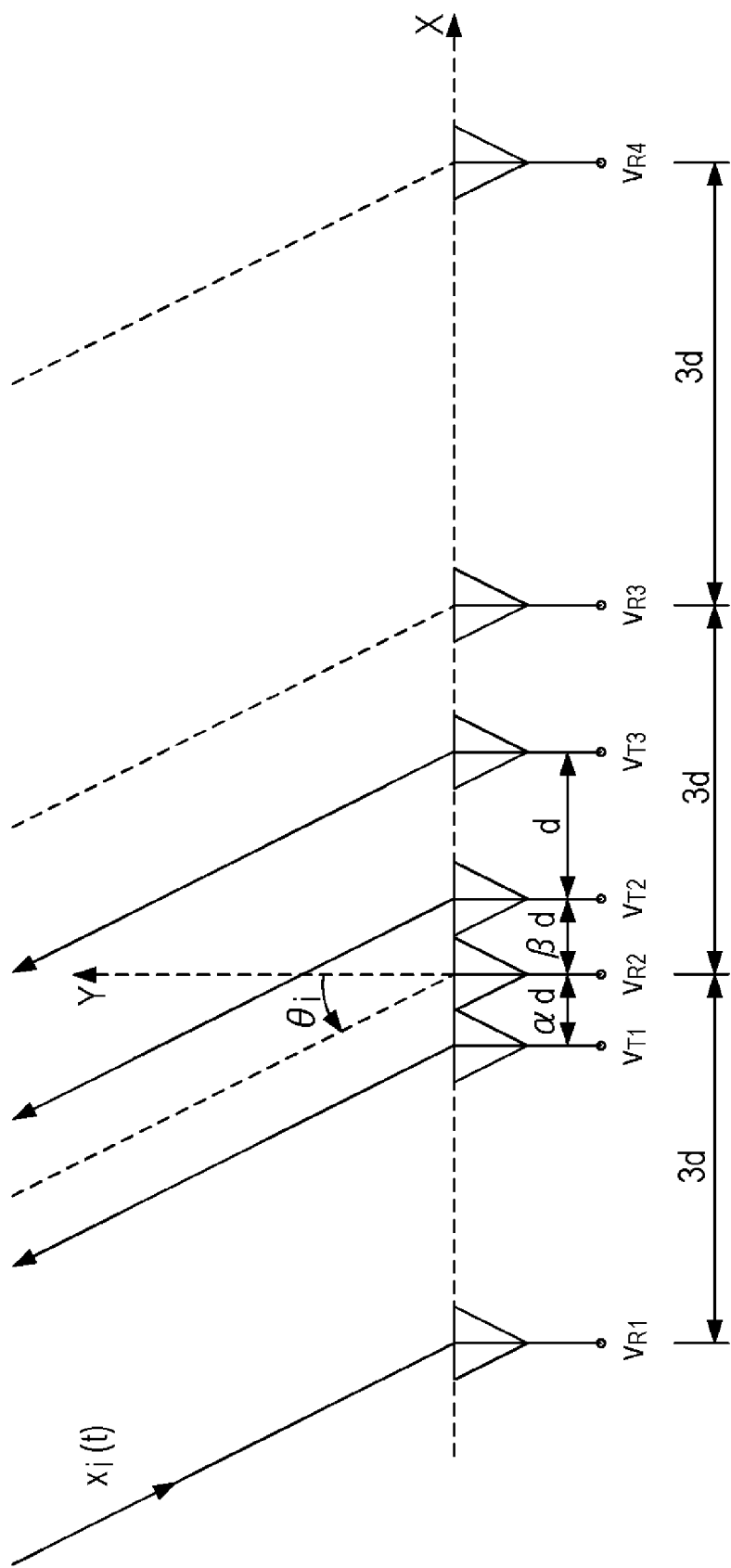
FIG. 9 illustrates a configuration of a fourth embodiment.

FIG. 9 illustrates a fourth embodiment of the detection and ranging apparatus in accordance with the present invention.

The detection and ranging apparatus of the fourth embodiment has three transmitting elements $V_{T1}$ to $V_{T3}$, and four receiving elements $V_{R1}$ to $V_{R4}$.

In FIG. 9, the transmitting elements $V_{T1}$ to $V_{T3}$ are spaced apart at an equal distance d. The receiving elements $V_{R1}$ to $V_{R4}$ are spaced apart at an equal distance 3d. Here, when the position of the receiving element $V_{R2}$ is set to the X-axis coordinate base (zero), the receiving element $V_{R1}$ and the transmitting element $V_{T1}$ are located on the negative side of the X axis, and the transmitting elements $V_{T2}$ and $V_{T3}$, and the receiving elements $V_{R3}$ and $V_{R4}$ are located on the positive side of the X axis. Regarding the distance from $V_{R2}$ to each element, the distance from $V_{R2}$ to $V_{R1}$ is 3d, the distance from $V_{R2}$ to $V_{R3}$ is 3d, the distance from $V_{R2}$ to $V_{R4}$ is 6d, the distance from $V_{R2}$ to $V_{T1}$ is $\alpha$d, the distance from $V_{R2}$ to $V_{T2}$ is $\beta$d, and the distance from $V_{R2}$ to $V_{T3}$ is $(1+\beta)$d. Therefore, when the receiving element $V_{R2}$ is set to the base (zero spatial phase) and considered in the same manner as in the aforementioned embodiments, the spatial phases of the receiving elements $V_{R1}$, $V_{R3}$, and $V_{R4}$ are "$-3\phi$", "$3\phi$", and "$6\phi$", respectively, and the spatial phases of the transmitting elements $V_{T1}$, $V_{T2}$, and $V_{T3}$ are "$-\alpha\phi$", "$\beta\phi$", and "$(1+\beta)\phi$", respectively.

Consequently, when the constraint condition "$\alpha+\beta=1$" is introduced, the spatial phases of the transmitting elements $V_{T1}$, $V_{T2}$, and $V_{T3}$ may be expressed as "$-\alpha\phi$", "$(1-\alpha)\phi$", and "$(2-\alpha)\phi$", respectively. Thus, from the combination of the three transmitting elements $V_{T1}$ to $V_{T3}$ and four receiving elements $V_{R1}$ to $V_{R4}$, the 3×4=12 mixed phases as illustrated in FIG. 10 are provided for each object.

As listed in the table, the detection and ranging apparatus of the fourth embodiment may receive 12 echo signals each of whose spatial phase is different from each other for each object using three transmitting elements and four receiving elements. Here, the spatial phases of the 12 echo signals are "$(-3-\alpha)\phi$" to "$(8-\alpha)\phi$" respectively, with each spatial phase being shifted by an equal amount of phase of $\phi$. Therefore, the configuration may provide a detection and ranging apparatus equivalent to a configuration where 12 receiving elements are spaced apart at an equal distance d. Note that the physical aperture of the sensor in accordance with the fourth embodiment is 9d.

As the detection and ranging apparatus of the embodiments have been described with reference to FIGS. 3 to 10, when an M number of transmitting elements and an N number of receiving elements are to be arranged, an M×N element equally spaced sensor array may be provided by introducing a constraint condition.

Hereinafter, a method of designing a sensor array provided in the aforementioned detection and ranging apparatus will be described. Here, an assumption is made to design an arrangement of sensor elements for achieving a synthesized array factor h expressed by the following expression (7). This array factor h denotes an array factor of a sensor array made up of a maximum K number of receiving elements and is a polynomial equation of z.

$$h(z; u) = \sum_{k=0}^{K-1} u_k z^k \tag{7}$$

z behaves as a parameter to a wavelength $\lambda$ of a carrier signal, a maximum field of view (FOV) to be covered by a synthesized sensor array, and a standardized element spacing distance d determined by the aforementioned two values and the apparatus size, and is expressed by the following expression (8). In the expression (8), j denotes an imaginary unit. A coefficient vector u of the polynomial equation is defined by the following expression (9) and behaves as a parameter for specifying a characteristic (corresponding to a physical quantity such as a current distribution related to each sensor element, for example, a gain, a side lobe shape, and the like) of the detection and ranging apparatus by the value. When the design is implemented, a general sensor array designing program or the like is used to calculate a desired value of the coefficient vector in advance. It should be noted that the intention of defining K as a maximum number of receiving elements is to indicate that an element of u may include zero.

$$z = \exp\left[-j\frac{2\pi d}{\lambda}\sin(\theta)\right] = \exp(j\phi), \text{ for } \forall\,\theta \in F.O.V \quad (8)$$

$$u = [u_0, \ldots, u_{K-1}]^T \quad (9)$$

The array factor f of the transmitting array is a polynomial equation of z and is expressed by the following expression (10). The vector r in the expression (10) is a coefficient sequence of a polynomial equation f and is defined by the following expression (11). In addition, the vector p(z) is an exponential sequence of the polynomial equation f with basis z and is defined by the following expression (12). Note that $p_m$ (m=1 to M−1) appearing in the expression (12) is a parameter for specifying an actual element spacing distance for a standardized element spacing distance d and an integer exponent m.

$$f(z; r, p) = r^T p(z) = \sum_{m=0}^{M-1} r_m z^{p_m m} \quad (10)$$

$$r = [r_0, \ldots, r_{M-1}]^T \quad (11)$$

$$p(z) = [1, z^{p_1}, \ldots, z^{p_{M-1}(M-1)}]^T \quad (12)$$

Moreover, the array factor g of the receiving array is a polynomial equation of z, and is expressed by the following expression (13). The vector s appearing in the expression (13) is a coefficient sequence of a polynomial equation g, and is defined by the following expression (14). In addition, the vector q(z) is an exponential sequence of the polynomial equation g with basis z and is defined by the following expression (15). Note that $q_n$ (n=1 to N−1) appearing in the expression (15) is a parameter for specifying an actual element spacing distance for a standardized element spacing distance d and an integer exponent n.

$$g(z; s, q) = s^T q(z) = \sum_{n=0}^{N-1} s_n z^{q_n n} \quad (13)$$

$$s = [s_0, \ldots, s_{N-1}]^T \quad (14)$$

$$q(z) = [1, z^{q_1}, \ldots, z^{q_{N-1}(N-1)}]^T \quad (15)$$

Here, holographic synthesis of a transmitting sensor array having an M number of elements and a receiving sensor array having an N number of elements may achieve the characteristics of a receiving sensor array having a K number of elements.

A general principle may be said to indicate "factorizing so that a product of the array factor f and the array factor g is equal to the array factor h after holographic synthesis". More specifically, regarding $\forall k \in [0, K-1]$, the sensor elements are desirably arranged in such a manner that at least one or more combinations of $m \in [0, M-1]$ and $n \in [0, N-1]$ satisfying the following expression (16) exists. At this time, if possible, as expressed by the expression (17), each of the polynomial equations f and g is further factorized into the product of a plurality of polynomial equations. Note that the method of specifying the parameters $r_m$, $p_m$, $s_n$, and $q_n$ will be described later.

$$\left.\begin{array}{l}h(z; u) = \displaystyle\sum_{k=0}^{K-1} u_k z^k \\ = f(z; r, p)g(z; s, q) \\ = \displaystyle\sum_{m=0}^{M-1}\sum_{n=0}^{N-1} r_m s_n z^{(p_m m + q_n n)} \\ (u_k = r_m s_n) \cap (k = p_m m + q_n n)\end{array}\right\} \quad (16)$$

$$\left.\begin{array}{l}f(z; r, p) = \displaystyle\prod_x f_x(z; r_x, p_x) \\ g(z; s, q) = \displaystyle\prod_y g_y(z; s_y, q_y)\end{array}\right\} \quad (17)$$

Note that each base point of K, M, and N (that is, upper and lower limits of k, m, and n each of which is a sum index of the array factors) may be arbitrarily changed. Consequently, when the array factor synthesis is considered, each polynomial equation representing the transmitting array and the receiving array may be treated independently of an actual sensor arrangement (relative positional relationship of transmitting and receiving arrays). At this time for example, when each polynomial equation representing the transmitting array and the receiving array is expressed as a polynomial equation with first term "1", the calculation may be simplified.

Based on the aforementioned principle, description will focus on a specific method (element arranging method) of designing an appropriate transmitting/receiving sensor array required for using holographic synthesis to configure a sensor array having a desired characteristic (synthesized array factor).

As the first example, by referring to the configuration illustrated in FIG. 3, the design method will be described. The configuration of FIG. 3 is implemented by a 6-element equally spaced sensor array by holographic synthesis of two transmitting elements and three receiving elements; that is, K=6, M=2, and N=3. The expression (18) indicates that the synthesized array factor h is factorized into a product of the array factor "1+z³" of the transmitting array (hereinafter abbreviated to transmitting array "1+z³", and the like) and the array factor "1+z+z²" of the receiving array (hereinafter abbreviated to receiving array "1+z+z²", and the like). The expression (19) uses a vector notation to represent each transmitting/receiving array factor along the lines of expressions (10) to (15).

$$h(z; u) = \sum_{k=0}^{6-1} z^k = \sum_{m=0}^{2-1} z^{3m} \sum_{n=0}^{3-1} z^n = (1 + z^3)(1 + z + z^2) \quad (18)$$

-continued $$r = [1, \ 1]^T, p(z) = [1, \ z^3]^T$$
$$s = [1, \ 1, \ 1]^T, q(z) = [1, \ z, \ z^2]^T \tag{19}$$

Here, when the first term "1 $(=z^0)$" of the polynomial equation in the transmitting array "$1+z^3$" is construed to represent the element (transmitting element $V_{T1}$) located at the base position of the transmitting array, "$z^3$" is construed to represent arranging a transmitting element in a position spaced a distance 3d away from the base position of the transmitting array. This is the transmitting element $V_{T2}$ in FIG. 3.

On the other hand, when the first term "1 $(=z^0)$" of the polynomial equation in the receiving array "$1+z+z^2$" is construed to represent the element (receiving element $V_{R1}$) located at the base position of the receiving array, each term of "$z (=z^1)$" and "$z^2$" is construed to represent arranging receiving elements each in a position spaced a distance d and a distance 2d respectively away from the base position of the receiving array. These are receiving elements $V_{R2}$ and $V_{R3}$ respectively in FIG. 3. Here, the base positions of the transmitting array "$1+z^3$" and the receiving array "$1+z+z^2$" may be arbitrarily determined for each array. This is because, for example, even if the transmitting array "$1+z^3$" is represented as a polynomial equation "$z^{-1}+z^2$", the phase relationship between the transmitting elements $V_{T1}$ and $V_{T2}$ is not changed. The physical meaning of this is that "the relative arrangement relationship between the transmitting array and the receiving array may be arbitrarily set". For example, in the example illustrated in FIG. 11A, in comparison with the configuration illustrated in FIG. 3, the transmitting array moves in the positive direction by a distance $2\alpha d$ (X coordinate conversion in FIG. 3). In addition, in the example illustrated in FIG. 11B, in comparison with the configuration illustrated in FIG. 3, the transmitting array moves in the positive direction by a distance $(1+2\alpha)d$ (X coordinate conversion in FIG. 3). However, the synthesized array factor is determined by the relative phase relationship of the transmitting/receiving array, and thus any arrangement is equivalent.

The base position of the transmitting array and the receiving array may be determined, for example, by considering the size of a detection and ranging apparatus. That is, the detection and ranging apparatus in the configuration illustrated in FIG. 3 is smaller than the detection and ranging apparatuses in the configurations illustrated in FIGS. 11A and 11B.

Previously, description has been given that "$1+z^3$" and "$1+z+z^2$" are obtained from the expression (18); "$1+z^3$" is allocated to the transmitting array; and "$1+z+z^2$" is allocated to the receiving array. Alternatively, "$1+z^3$" may be allocated to the receiving array, and "$1+z+z^2$" may be allocated to the transmitting array. In this case, two receiving elements are spaced a distance 3d apart, and three transmitting elements spaced apart at an equal distance d.

As the next example, by referring to the configuration illustrated in FIG. 7, the design method will be described. In the configuration of FIG. 7, a 12-element equally spaced sensor array is implemented with three transmitting elements and four receiving elements. That is, K=12, M=3, and N=4. The expression (20) indicates that the synthesized array factor h is factorized into a product of the transmitting array "$1+z+z^2$" and the receiving array "$1+z^3+z^6+z^9$". The expression (21) uses a vector notation to represent each transmitting/receiving array factor along the lines of expressions (10) to (15).

$$h(z; u) = \sum_{k=0}^{12-1} z^k \tag{20}$$

$$= \sum_{m=0}^{3-1} z^m \sum_{n=0}^{4-1} z^{3n}$$

$$= (1 + z + z^2)(1 + z^3 + z^6 + z^9)$$

$$r = [1, \ 1, \ 1]^T, p(z) = [1, \ z, \ z^2]^T$$
$$s = [1, \ 1, \ 1, \ 1]^T, q(z) = [1, \ z^3, \ z^6, \ z^9]^T \tag{21}$$

Here, when the first term "1" of the transmitting array "$1+z+z^2$" is construed to represent the transmitting element $V_{T1}$ located at the base position of the transmitting array, each term of "z" and "$z^2$" is construed to represent arranging transmitting elements each in a position spaced a distance d and a distance 2d respectively away from the base position of the transmitting array. These are the transmitting elements $V_{T2}$ and $V_{T3}$ in FIG. 7.

On the other hand, when the first term "1" of the receiving array "$1+z^3+z^6+z^9$" is construed to represent the receiving element $V_{R1}$ located at the base position of the receiving array, each term of "$z^3$", "$z^6$", and "$z^9$" is construed to represent arranging a receiving element in a position spaced distances 3d, 6d, and 9d respectively away from the base position of the receiving array. These are receiving elements $V_{R2}$, $V_{R3}$, and $V_{R4}$ respectively in FIG. 7.

Based on the above examples, the essence of the holographic synthesis is defined to "determine a pair of polynomial equations f(z; r, p) and g(z; s, q) capable of sampling all zero points of the polynomial equation h(z; u)". This is easy to understand because when considering the case where an equally spaced sensor array having the coefficient vector u whose elements are all ones is made of a transmitting array (coefficient: r) having the coefficient vector whose elements are all ones and a receiving array (coefficient: s) having the coefficient vector whose elements are all ones, the polynomial equation h becomes a cyclotomic polynomial.

Figure 12:
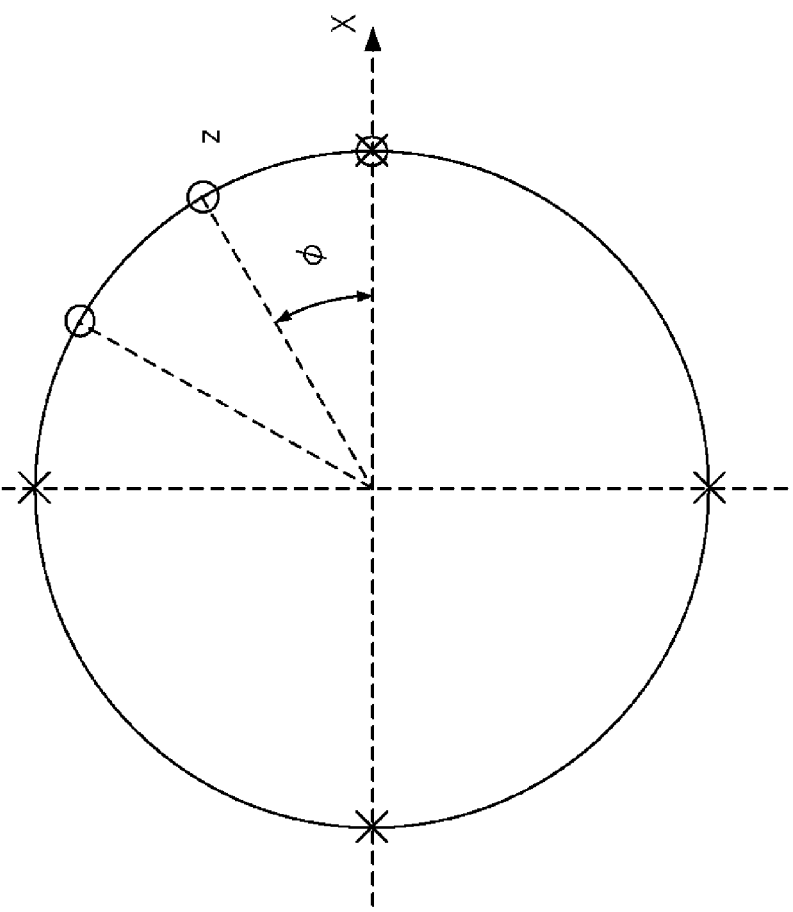
FIG. 12 illustrates a relationship between polynomial equations on a Gaussian plane.

In light of this, description will be given using the above expression (20) as an example. Considering that the expression (20) may be converted to the following expression (22), the positional relationship of the zero points of the polynomial equations $r^T p(z)$ and $s^T q(z)$ is displayed on the Gaussian plane as illustrated in FIG. 12 (for ease of seeing, all points are plotted schematically using the entire circumference).

$$h(z; u) = \sum_{k=0}^{12-1} z^k = \frac{1-z^{12}}{1-z} = \left(\frac{1-z^3}{1-z}\right)\left[\left(\frac{1-z^{12}}{1-z^3}\right)\right] \tag{22}$$

$$\frac{1-z^3}{1-z} = 1 + z + z^2 = r^T p(z) \tag{22.1}$$

$$\frac{1-z^{12}}{1-z^3} = 1 + z^3 + z^6 + z^9 = s^T q(z) \tag{22.2}$$

In the figure, an "x" mark denotes the position of the zero point of the receiving array $s^T q(z)$, and a circle mark denotes the position of the zero point of the transmitting array $r^T p(z)$. That is, the circle mark is arranged so as to sample a circular arc corresponding to a pair of mutually adjacent x marks. Therefore, for example, when the circle mark currently overlapping the x mark on the positive X axis is moved sequentially together with other circle marks to each position of the x mark on the positive Y axis, the negative X axis, and the negative Y axis, all the zero points of the polynomial equation h dividing the circumference equally into 12 divisions at a distance of ϕ may be represented. In other words, if each circle mark currently arranged counterclockwise from the positive X axis is construed to represent the transmitting element corresponding to each term of "1", "z", and "$z^2$" of the polynomial equation $r^T p(z)$, likewise, each x mark may be construed to represent the receiving element corresponding to each term of "1", "$z^3$", "$z^6$", and "$z^9$" of the polynomial equation $s^T q(z)$. Therefore, the above movement of the marks corresponds to receiving a probe signal from each transmitting element by each receiving element as an echo signal.

Meanwhile, an equally spaced array is a practical and desirable configuration of the detection and ranging apparatus. Therefore, the following description will focus on the method of determining whether or not a sensor obtained by holographic synthesis of the transmitting array and the receiving array is an equally spaced array. Here, the configurations illustrated in FIGS. 13 and 5 are discussed.

Figure 13:
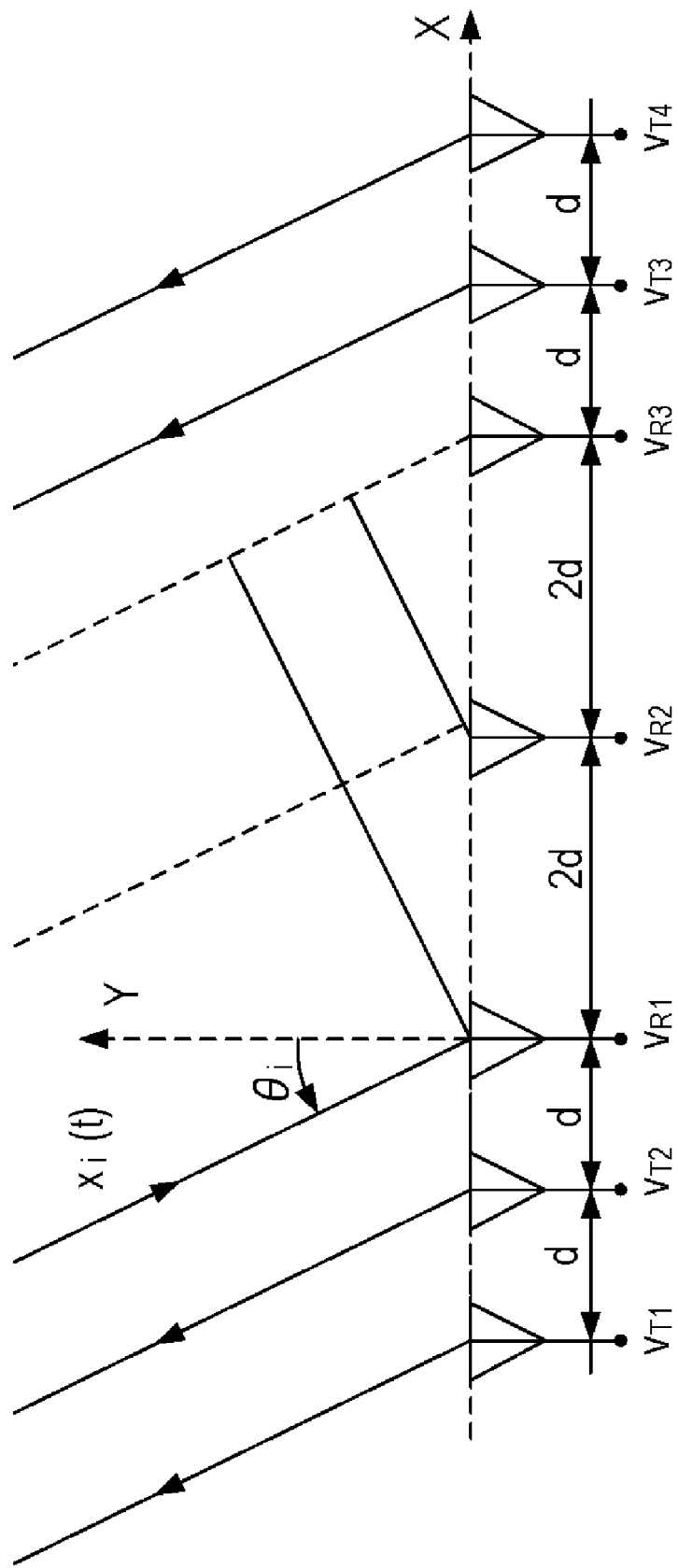
FIG. 13 illustrates an example of an unequally spaced arrangement.

In the configuration illustrated FIG. 13, the array factor $f_1$ of the transmitting array is expressed by expression (23). In the configuration illustrated FIG. 5, the array factor $f_2$ of the transmitting array is expressed by expression (24).

$$f_1(z;r,p) = 1 + z + z^7 + z^8 \qquad (23)$$

$$f_1(z;r,p) = 1 + z + z^6 + z^7 \qquad (24)$$

On the other hand, the array factor g of the receiving array, which is the same as the receiving arrays in the configurations illustrated in FIGS. 13 and 5, is expressed by expression (25).

$$g(z;s,q) = 1 + z^2 + z^4 \qquad (25)$$

Here, the expressions (23) and (24) are factorized as the product of the cyclotomic polynomial. When each of the expressions including the expression (25) is represented in the sum of geometrical series formula, the expressions (26) to (28) are obtained.

$$f_1(z;r,p) = (1+z)(1+z^7) = \left(\frac{1-z^2}{1-z}\right)\left(\frac{1-z^{14}}{1-z^7}\right) \qquad (26)$$

$$f_2(z;r,p) = (1+z)(1+z^6) = \left(\frac{1-z^2}{1-z}\right)\left(\frac{1-z^{12}}{1-z^6}\right) \qquad (27)$$

$$g(z;s,q) = 1 + z^2 + z^4 = \frac{1-z^6}{1-z^2} \qquad (28)$$

Consequently, the synthesized array factor of the configuration illustrated in FIG. 13 is expressed by the expression (29). In addition, the synthesized array factor of the configuration illustrated in FIG. 5 is expressed by the expression (30).

$$f_1(z;r,p)g(z;s,q) = \left(\frac{1-z^2}{1-z}\right)\left(\frac{1-z^{14}}{1-z^7}\right)\left(\frac{1-z^6}{1-z^2}\right) \qquad (29)$$

$$= \frac{(1-z^6)(1-z^{14})}{(1-z)(1-z^7)}$$

$$f_2(z;r,p)g(z;s,q) = \left(\frac{1-z^2}{1-z}\right)\left(\frac{1-z^{12}}{1-z^6}\right)\left(\frac{1-z^6}{1-z^2}\right) \qquad (30)$$

$$= \frac{1-z^{12}}{1-z}$$

$$= \sum_{k=0}^{12-1} z^k$$

Thus, the configuration illustrated in FIG. 5 is determined that equally spaced array is formed since it is expressed by a form $$\sum_{k=0}^{K-1} z^k.$$

In contrast to this, the configuration illustrated in FIG. 13 is determined that an equally spaced array is not formed since it may not be expressed by the form $$\sum_{k=0}^{K-1} z^k.$$

The method of configuring an equally spaced array by holographic synthesis may be generalized, for example, as follows. Here, the following expressions (31) to (33) are referred to.

$$f(z;r,p) = \prod_{x=1}^{M_{TX}} f_x(z;r_x,p_x) = \prod_{x=1}^{M_{TX}} \frac{1 \pm z^{\eta_x M_x}}{1 \pm z^{\eta_x}}, \sum_{x=1}^{M_{TX}} M_x = M \qquad (31)$$

$$g(z;s,q) = \prod_{y=1}^{N_{RX}} g_y(z;s_y,q_y) = \prod_{y=1}^{N_{RX}} \frac{1 \pm z^{\gamma_y N_y}}{1 \pm z^{\gamma_y}}, \sum_{y=1}^{N_{RX}} N_y = N \qquad (32)$$

$$h(z;u) = f(z;r,p)g(z;s,q) \qquad (33)$$

$$= \prod_{x=1}^{M_{TX}} \sum_{y=1}^{N_{RX}} \frac{1 \pm z^{\eta_x M_x}}{1 \pm z^{\eta_x}} \frac{1 \pm z^{\gamma_y N_y}}{1 \pm z^{\gamma_y}}$$

$$= \frac{1 \pm z^K}{1 \pm z}$$

First, based on the characteristics of the sensor array to be provided by holographic synthesis, the number of elements K of the synthesized array and the standard element spacing distance d are determined. In addition, the number of transmitting elements M and the number of receiving elements N are determined so as to satisfy K=M×N. Note that for simplicity of explanation, description of the coefficient vector is omitted here.

Next, with respect to the above distance d, an $M_x$ number of transmitting elements are spaced apart a distance having a scale factor $\eta_x$ (physical distance $\eta_x d$) to form a set of an $M_{TX}$ number of transmitting arrays, and the transmitting array is configured in such a manner that an array factor based on the total of an M number of transmitting elements may be given by the expression (31). Likewise, with respect to the above distance d, an $N_y$ number of receiving elements are spaced apart a distance having a scale factor $\gamma_y$ (physical distance $\gamma_y d$)

to form a set of an $N_{RX}$ number of receiving arrays, and the receiving array is configured in such a manner that an array factor based on the total of an N number of receiving elements may be given by the expression (32).

Finally, each of the parameters such as $\eta_x$, $M_x$, $\gamma_y$, and $N_y$ is adjusted so that the array factor after synthesis becomes substantially equal to the rightmost hand side of the expression (33).

However, when K (=M×N) is a prime number, it is difficult to spatially arrange the transmitting array and the receiving array in an effective manner. In other words, if K is not a prime number, basically, with respect to $\forall x \in M_{TX}$ and $\forall y \in N_{RX}$, $\eta_x$ and $\eta_x M_x$, $\gamma_y$ and $\gamma_y N_y$ are appropriately selected from the divisors 1 and K and may be combined so as to be substantially equal to the expression of sum of a K-degree geometrical series and successfully satisfy reduction in total. For example, by referring to expressions (27), (28), and (30), with respect to K=12, $\eta_x$ is 1 and 6, $\eta_x M_x$ is 2 and 12, $\gamma_y$ is 2, and $\gamma_y N_y$ is 6. Note that this relationship also satisfies the expression (18) or (22).

It should be noted that the expressions (31) to (33) also disclose the case where the sum of the series is represented by a rational function including a form of "$1+z^L$". This is assuming the case of using a cyclotomic polynomial such as the expression (34).

$$z^2 - z + 1 = \frac{1+z^3}{1+z} \quad (34)$$

Alternatively, assuming a simpler case, when holographic synthesis is performed on a K-element equally spaced sensor array, the sensor elements may be arranged with respect to the standard distance d between sensor elements as follows. Note that the number of transmitting elements M and the number of receiving elements N are assumed to be given in advance so as to satisfy K=M×N. (1) Select element spacing distance scale factors $\eta$ and $\gamma$ with respect to d from the divisors 1 and K; (2) arrange an M number of transmitting elements at a spacing distance $\eta d$; (3) arrange an N number of receiving elements at a spacing distance of $\gamma d$; (4) express the array factors of transmitting/receiving sensors with the expression (35); and (5) determine the final element arrangement by appropriately changing $\eta$ and $\gamma$ so that the product of polynomial equations f and g match the desired polynomial equation h.

$$f(z; r, p) = \sum_{m=0}^{M-1} z^{\eta m} = \frac{1-z^{\eta M}}{1-z^{\eta}}$$
$$g(z; s, q) = \sum_{n=0}^{N-1} z^{\gamma n} = \frac{1-z^{\gamma N}}{1-z^{\gamma}} \quad (35)$$
$$\eta(M-1) + \gamma(N-1) = K-1$$

Moreover, when the elements of the vector u are arbitrary numerical values including zeroes (for example, when the synthesized array requires exhibiting a desired amplitude/phase characteristics such as Chebyshev characteristics and Taylor characteristics), design should be made as follows. That is, for example, the characteristics of an individual sensor element configuring the transmitting/receiving array are adjusted. Alternatively, the sensor element, the amplifier, the phase shifter, and the like may be combined. Still alternatively, data of elements satisfying a specific phase relationship may be sampled a number of times and synthesized by appropriately setting a system operation sequence. Any design method comes down to determining parameters such as vectors r and s in expressions (11) and (14).

In particular, when the elements of the vector u contain an integer whose absolute value is larger than 1, there may be an element redundantly acquiring data. Consequently, the array factor polynomial equation may be used to improve redundancy of system configuration, the characteristics, and the like. For example, an assumption is made that the polynomial equation f for the transmitting array matches the polynomial equation g for the receiving array as expressed by the expression (36).

$$f(z;r,p)=g(z;s,q)=1+z+z^3+z^5 \quad (36)$$

In this case, the result of the holographic synthesis is expressed by the expression (37).

$$f(z;r,p)g(z;s,q)=(1+z+z^3+z^5)^2=1+2z^2+2z^3+2z^4+2z^5+3z^6+2z^8+z^{10} \quad (37)$$

The expression (37) lacks the terms $z^7$ and $z^9$. Therefore, even if the apparatus is configured based on this polynomial equation, it is understood that the apparatus does not operate as the equally spaced array. In addition, the coefficients other than 1, $z^2$, and $z^{10}$ are 2 or 3, which indicates that data corresponding to these coefficients is redundantly sampled. Therefore, the signal-to-noise ratio of the synthesized receiving antennas varies for each antenna, which is expected to cause undesirable effects.

It may be noted that the above described method of implementing holographic synthesis based on factorization of polynomial equations does not require implementing the transmitting function and the receiving function by different elements. Consequently, any one of or all of the transmitting and receiving elements may have both the transmitting and receiving functions.

Figure 14:
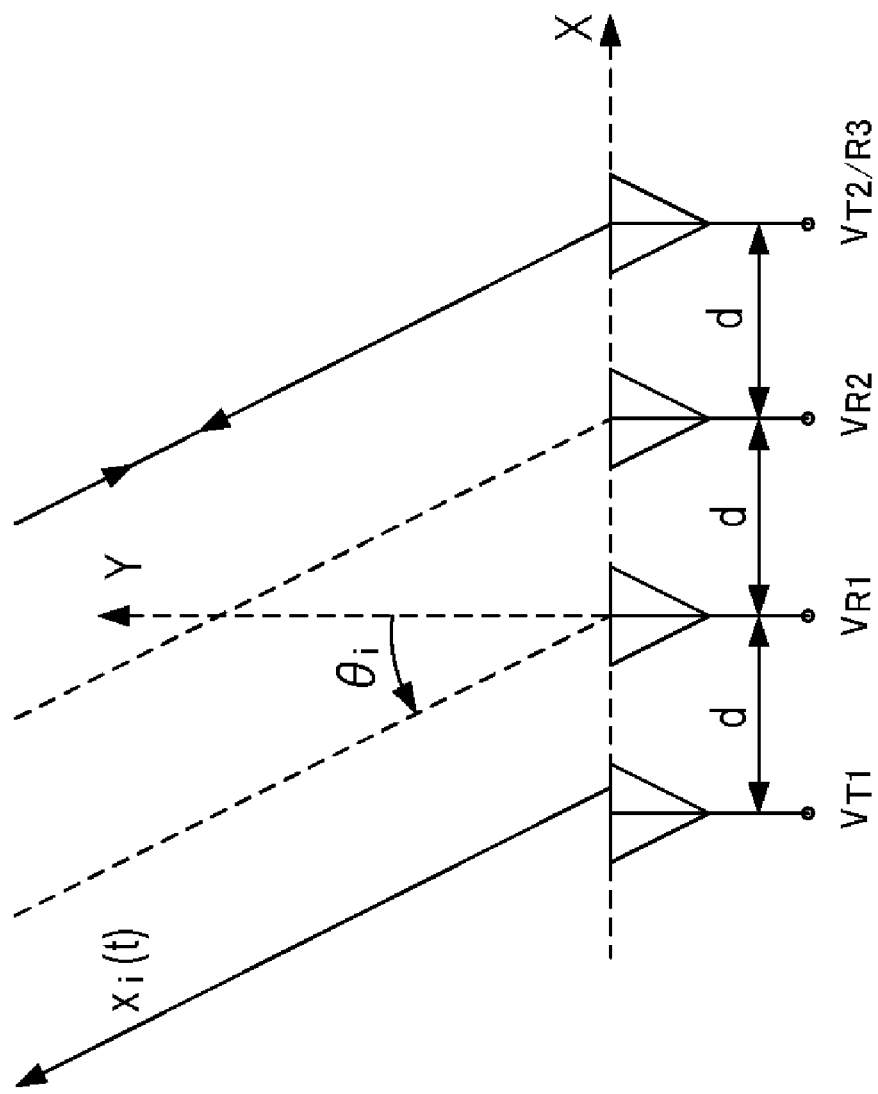
FIG. 14 illustrates an embodiment having transmitting/receiving shared elements.

FIG. 14 illustrates an embodiment of a sensor array having transmitting/receiving shared elements. In this embodiment, the transmitting element $V_{T1}$, the receiving element $V_{R1}$, the receiving element $V_{R2}$, and the transmitting/receiving element $V_{T2/R3}$ are spaced apart at an equal distance d. The transmitting/receiving element $V_{T2/R3}$ operates not only as the transmitting element $V_{T2}$ but also as the receiving element $V_{R3}$. The transmitting function and the receiving function may be implemented at the same time. In this case, for example, radar uses a circulator element and the like for implementation. Moreover, the transmitting function and the receiving function may be implemented in the time-sharing system. In this case, for example, radar uses a switch element and the like for implementation.

In the configuration illustrated in FIG. 14, based on the receiving element $V_{R1}$, the mixed phases obtained by a combination of the spatial phase of each sensor element and these elements are as listed in FIG. 15. That is, the configuration may provide a detection and ranging apparatus equivalent to a configuration where six receiving elements are spaced apart at an equal distance d.

Figure 16:
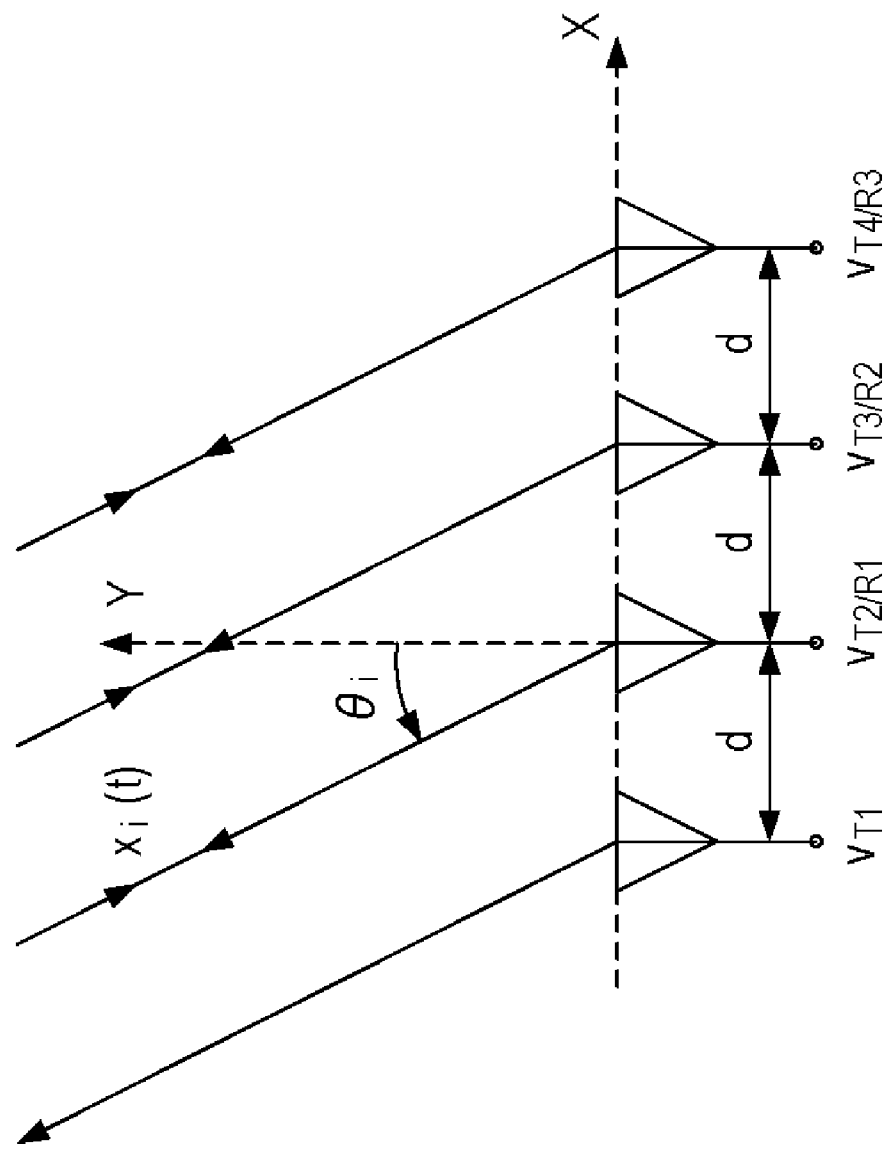
FIG. 16 illustrates another embodiment having transmitting/receiving shared elements.

FIG. 16 illustrates another embodiment of a sensor array having transmitting/receiving shared elements. In this embodiment, the transmitting element $V_{T1}$, and the transmitting/receiving elements $V_{T2/R1}$, $V_{T3/R2}$, and $V_{T4/R3}$ are spaced apart at an equal distance d. In this case, based on the receiving element $V_{R1}$, the mixed phases obtained by a combination of the spatial phase of each sensor element and these elements are as listed in FIG. 17. That is, in the same manner as in FIG. 14, the configuration may provide a detection and ranging apparatus equivalent to a configuration where six receiving elements are spaced apart at an equal distance d. However, in comparison with FIG. 15, FIG. 17 lists a plurality of combinations of transmitting/receiving elements having the same mixed phases. Therefore, the configuration of FIG. 16 is less efficient than the configuration of FIG. 14.

The transmitting/receiving array factor in the configuration illustrated in FIG. 14 is f1 in the expression (38) and g in the expression (39). The synthesis result of the transmitting/receiving array factors is h1 in the expression (40). Meanwhile, the transmitting/receiving array factor in the configuration illustrated in FIG. 16 is f2 in the expression (38) and g in the expression (39). The synthesis result of the transmitting/receiving array factors is h2 in the expression (40). It is understood only from the calculation results of these polynomial equations that a 6-element equally spaced sensor array is synthesized in both configurations of FIGS. 14 and 16. By further referring to the coefficients, it is understood that the configuration of FIG. 16 is not efficient. Note that the configuration having a transmitting/receiving shared element does not always satisfy K=M×N, but generally "K≧max(M, N)". "max(M, N)" is a function to return one of M and N whichever is larger. That is, if "M≧N", "M" is outputted and if "M<N", "N" is outputted.

$$f_1(z; r, p) = 1 + z^3 = \frac{1-z^6}{1-z^3}$$
$$f_2(z; r, p) = 1 + z + z^2 + z^3 = \frac{1-z^4}{1-z}$$
(38)

$$g(z; s, q) = 1 + z + z^2 = \frac{1-z^3}{1-z}$$
(39)

$$h_1(z; u) = f_1(z; r, p)g(z; s, q) = \frac{1-z^6}{1-z^3}\frac{1-z^3}{1-z} = \frac{1-z^6}{1-z} = \sum_{k=0}^{6-1} z^k$$
$$h_2(z; u) = f_2(z; r, p)g(z; s, q) = 1 + 2z + 3z^2 + 3z^3 + 2z^4 + z^5$$
(40)

When a coefficient other than "±1" exists in the expansion coefficient like the configuration illustrated in FIG. 16, the gain may be standardized or the like so that the signal-to-noise ratio of each receiving element is substantially equal by an element (amplifier, mixer, or the like) by adjusting the gain of the sensor element or the signal parameter.

Figure 18:
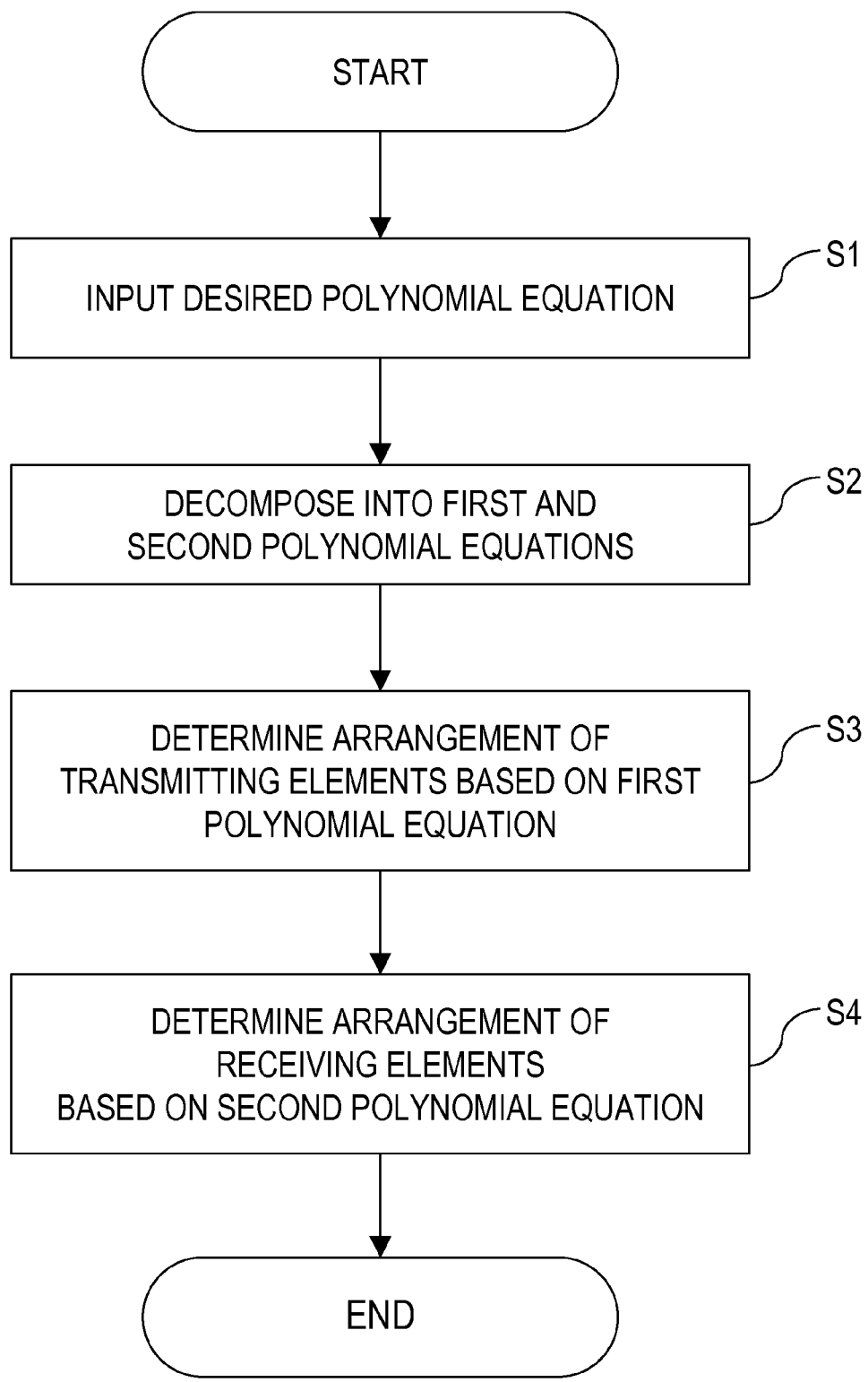
FIG. 18 is a flowchart illustrating a method of designing the detection and ranging apparatus in accordance with an embodiment.

FIG. 18 is a flowchart illustrating a method of designing the detection and ranging apparatus in accordance with an embodiment. In step S1, a desired polynomial equation is inputted. The desired polynomial equation represents a configuration satisfying the required specifications. For example, when a K-element equally spaced sensor array (configuration having characteristics equivalent to an array with an equally spaced K number of receiving sensor elements) is to be implemented, the following desired polynomial equation h is inputted. Note that the total number of elements K of the synthesized array, the standard element distance d (see the expression (8)) specifying the polynomial equation parameter z, the vector u, and the like may be given in advance according to the measurement angle range or the apparatus size.

$$h = \sum_{k=0}^{K-1} z^k$$

In step S2, the desired polynomial equation is decomposed into a first polynomial equation and a second polynomial equation. Here, each of the first and second polynomial equations may be a product of two or more polynomial equations. The specific algorithm of factorization in step S2 may be a generally existing technique such as a square-free decomposition, a Berlekamp algorithm, and a Hensel configuration. Alternatively, if the desired polynomial is a simple one such as a cyclotomic polynomial, the first and second polynomial equations may be directly calculated by the designer. Further, heuristic rules may be stored in a database for automation.

In step S3, the arrangement of an M number of transmitting elements is determined based on the first polynomial equation. For example, if the first polynomial equation is "1+z³", two transmitting elements $V_{T1}$ and $V_{T2}$ are required. Moreover, when the transmitting element $V_{T1}$ is set to the base, the transmitting element $V_{T2}$ is spaced by a distance 3d away from the transmitting element $V_{T1}$ (assuming that the element spacing distance of the K-element equally spaced sensor array is d).

In step S4, the arrangement of an N number of receiving elements is determined based on the second polynomial equation. For example, if the second polynomial equation is "1+z+z²", three receiving elements $V_{R1}$, $V_{R2}$, and $V_{R3}$ are required. Moreover, when the receiving element $V_{R1}$ is set to the base, the receiving element $V_{R2}$ is spaced a distance d away from the receiving element $V_{R1}$, and the receiving element $V_{R3}$ is spaced a distance 2d away from the receiving element $V_{R1}$ (see the above note on d).

At this time, in order to minimize the size of apparatus, it is preferable to determine the relative positional relationship between an M number of transmitting elements (only transmitting function) and an N number of receiving elements (only receiving function) so as to satisfy the aforementioned constraint condition "α+β=1". Note that as illustrated in FIGS. 14 to 17, this design method may use a transmitting/receiving shared element (in this case, the first polynomial equation may be the same as the second polynomial equation).

The process of the flowchart illustrated in FIG. 18 is executed, for example, by a computer. In this case, a design program coding the above process is executed by the computer.

Figure 19:
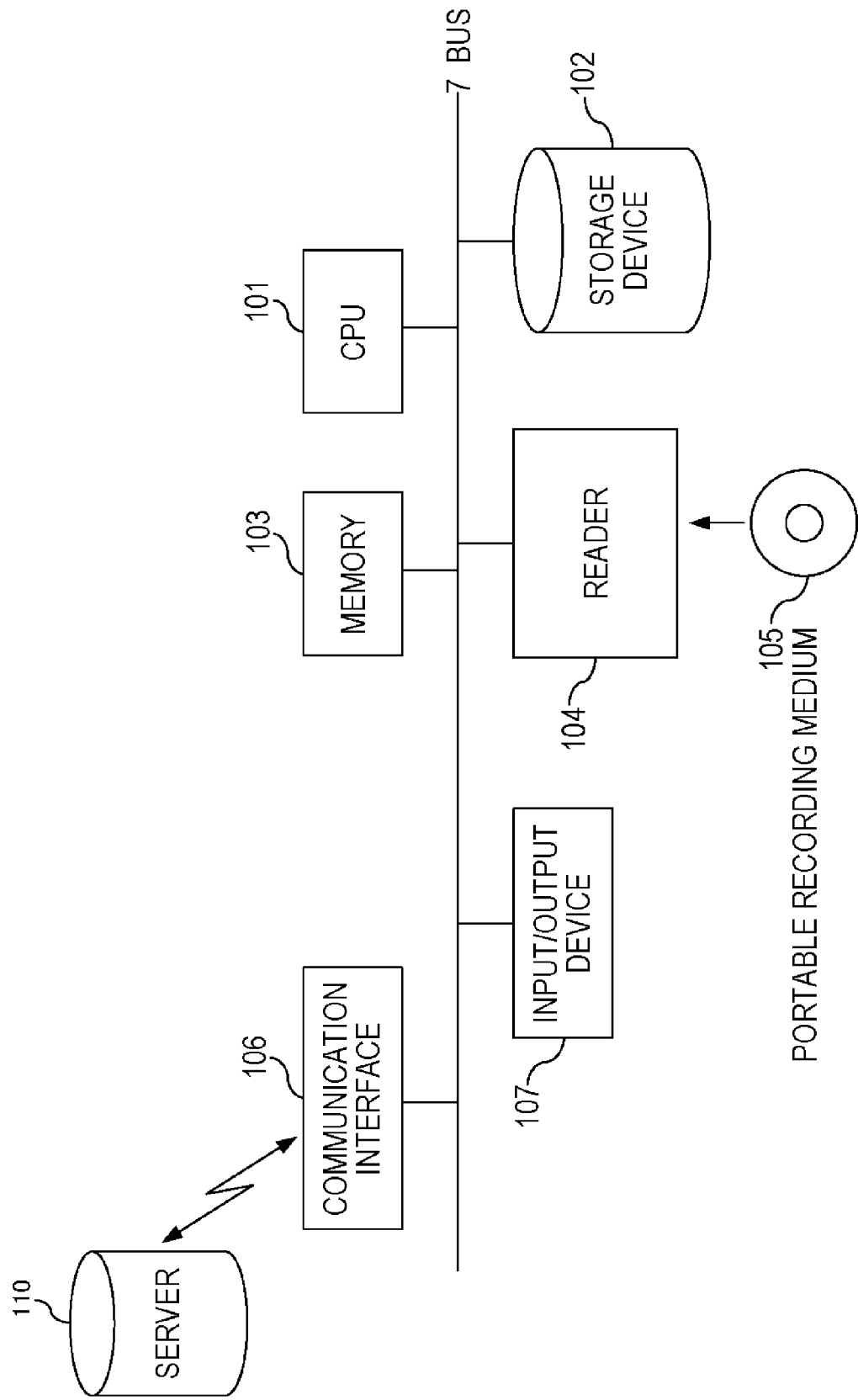
FIG. 19 illustrates a configuration of a computer executing a design program.

FIG. 19 illustrates a hardware configuration of the computer executing the aforementioned design program. In FIG. 19, a CPU 101 uses a memory 103 to execute the design program. A storage device 102 is, for example, a hard disk drive which stores the design program. Note that the storage device 102 may be an external recording device. The memory 103 is, for example, a semiconductor memory which is configured to include a RAM region and a ROM region.

A reader 104 accesses a portable recording medium 105 in response to an instruction of the CPU 101. Examples of the portable recording medium 105 may include a semiconductor device (PC card, etc.), a medium using magnetic action to input and output information, and a medium using optical action to input and output information. A communication interface 106 transmits and receives data via a network in response to an instruction of the CPU 101. An input/output device 107 in accordance with the present embodiment corresponds to a display device, a device receiving an instruction from a user, and other devices.

The design program in accordance with the present embodiment is delivered, for example, in the following form. (1) The program is preliminarily installed in the storage device 102. (2) The program is delivered with the portable recording medium 105. (3) The program is downloaded from a program server 110.

As described above, according to the design method of the present embodiment, in order to implement a K-element receiving sensor, the transmitting sensor array is configured from an M number of sensor elements and the receiving sensor array is configured from an N number of sensor elements. The arrangement of elements configuring the transmitting sensor array and the arrangement of elements configuring the receiving sensor array are determined in such a manner that the polynomial equation representing an array factor of the K-element sensor array may be expressed by a product of the polynomial equation of the transmitting sensor array and the polynomial equation of the receiving sensor array. At this time, each sensor element may be shared for transmitting and receiving.

For example, consider the case where the K-element equally spaced sensor array is configured with a standard element spacing distance d. If the scale factor $\eta$ for transmitting element arrangement is larger than the scale factor $\gamma$ for receiving element arrangement, namely, $\eta > \gamma$, first, the zero point phase of an M−1 degree polynomial equation is arranged on the Gaussian plane. Thereby, a plurality of transmission phase points are arranged. Next, the zero point phase of the N−1 degree polynomial equation is used to decompose the K−1 degree polynomial equation so as to sample the region between the plurality of transmission phase points at an equal distance.

Note that when the array factor after holographic synthesis expressed by the expression (41) is an integral coefficient polynomial equation, Eisenstein's theorem may be used to determine whether or not the polynomial equation may be decomposed into two or more polynomial equations f and g as expressed by the expression (42).

$$h(z; u) = \sum_{k=0}^{K-1} u_k z^k \tag{41}$$

$$h(z; u) = f(z; r, p) g(z; s, q) \tag{42}$$

Here, according to the Eisenstein's theorem, when the integral coefficient polynomial equation expressed by the following expression (43) satisfies the following two conditions a and b with respect to a prime number w, the polynomial equation is irreducible over the rational number field. (Condition: a) Prime number w is a divisor of $u_{k-1}$ to $u_0$. (Condition: b) $u_0$ may be aliquant with respect to $w^2$.

$$h(z) = z^K + u_{K-1} z^{K-1} + \ldots + u_1 z + u_0 \tag{43}$$

That is, when an array factor having an integer coefficient is to be obtained by the holographic synthesis, this relationship may be used to determine whether or not the holographic synthesis is successful. More generally, when an array factor of the transmitting array and the receiving array is defined so as to be an element of a polynomial ring of one variable, the holographic synthesis may increase the number of effective elements regardless of whether or not the elements are equally spaced apart.

As a method of implementing holographic synthesis intended for such a general configuration, for example, an embodiment will be described using the expression (16) as an example. Now, assuming that the number of elements M and N used for transmitting and receiving, the scale factor parameters $p_m$ and $q_n$ for arrangement of the transmitting/receiving elements with respect to the standard element spacing distance d, and the coefficient u of the array factor after holographic synthesis are given, consider to obtain the array factor coefficients r and s for transmitting/receiving.

First, since the transpose of a scalar is the same scalar, the expression (16) is transformed into the expression (44).

$$\begin{aligned} h(z; u) &= f(z; r, p) g(z; s, q) \\ &= r^T p(z) s^T q(z) \\ &= [r^T p(z)]^T s^T q(z) \\ &= p^T(z) [r s^T] q(z) \\ &= p^T(z) [U \Sigma V^H] q(z) \\ &= \left[ \sqrt{\Sigma^T} U^T p(z) \right]^T \left[ \sqrt{\Sigma} V^H q(z) \right] \end{aligned} \tag{44}$$

Here, $U \Sigma V^H$ is a singular value decomposition of a matrix $rs^T$. Note that "T" denotes transpose, and "H" denotes a Hermite transpose.

Next, with respect to an arbitrary $z \in F.O.V$, an M×N matrix A having a parameter $\{a_{m,n}\}$ (m=1 to M, N=1 to N) as an element is introduced, the element of A is determined by the least-squares method as a value minimizing an error function defined by the expression (45). Then, when singular value decomposition is performed on the obtained A, which is written as the expression (45.1), the expression (45.2) is obtained as the transmitting/receiving array factor using the coefficients r and s to be obtained.

$$\varepsilon(A) = \min_{\forall z \in F.O.V} |h(z; u) - f(z; r, p) g(z; s, q)|^2 \tag{45}$$

$$= \min_{\forall z \in F.O.V} \left| \sum_{k=0}^{K-1} u_k z^k - \sum_{m=0}^{M-1} \sum_{n=0}^{N-1} a_{m,n} z^{m+n} \right|^2$$

$$A \approx U \Sigma V^H \tag{45.1}$$

$$\left. \begin{aligned} f(z; r, p) &\approx \left[ \sqrt{\Sigma^T} U^T p(z) \right]^T \\ g(z; s, q) &\approx \left[ \sqrt{\Sigma} V^H q(z) \right] \end{aligned} \right\} \tag{45.2}$$

$$\varepsilon(A, p, q) = \min_{\forall z \in F.O.V} |h(z; u) - f(z; r, p) g(z; s, q)|^2 \tag{45.3}$$

$$= \min_{\forall z \in F.O.V} \left| \sum_{k=0}^{K-1} u_k z^k - \sum_{m=0}^{M-1} \sum_{n=0}^{N-1} a_{m,n} z^{(p_m m + q_n n)} \right|^2$$

Note that when the scale factor parameters $p_m$ and $q_n$ for arrangement of the transmitting/receiving elements are also to be determined, a nonlinear least-squares method such as a Newton method needs to be applied using an error function $\in(A, p, q)$ like the expression (45.3) including these parameters as the unknown.

Other Embodiments

The aforementioned detection and ranging apparatus may be configured to transmit the probe signals by multiplex. In this case, the detection and ranging apparatus has a circuit appropriately separating the received signals (echo signals). Examples of multiplex may include the time division multiplex (TDM), the frequency division multiplex (FDM), and the code division multiplex (CDM). The code division multiplex (CDM) is implemented in the configuration illustrated in FIG. 1. That is, mutually orthogonal different diffusion codes are allocated to each transmitting element. Alternatively, an oscillator may be provided for each transmitting antenna. In this case, for example, the frequency division multiplex (FDM) may be implemented. Alternatively, a different modulation system may be used for each transmitting antenna. Further, the multiplexing systems (TDM, FDM, and CDM) may be switched according to the radio propagation environment.

The detection and ranging apparatus of an embodiment may be configured to have a beam control device. The beam control device is provided in an appropriate position at a back stage of the sensor array (e.g., between the sensor array and the transceiver). The beam control device includes, for example, a switch such as a diode and MEMS, a phase shifter, a Butler matrix, a circulator, and a mixer. Alternatively, the beam control is not limited to the electrical process, but a configuration using lenses or the like may be used. Moreover, the beam control may be achieved by a signal processor at a back stage being implemented by a signal process based on the direction of the object estimated by a MUSIC (Multiple Signal Classification) method or the like. The beam control device orients the transmitting beam and/or the receiving beam in the angular direction estimated by the detection and ranging apparatus. This allows the detection and ranging apparatus to change the viewing range or achieve tracking operation.

When the antenna phase arrangement is unchanged with respect to rotation, the detection and ranging apparatus of the embodiment may use an ESPRIT or the like in combination.

Part of the transmitting elements and part of the receiving elements may be used to calibrate the detection and ranging apparatus while the detection and ranging apparatus is operating.

A fractal shaped sensor or the like may be used as one or both of the mutually adjacent transmitting element and receiving element to adjust the offset between the geometric center and the action center (electrical center when the sensor is an antenna element). In this case, the physical center and the functional center of the sensor elements may be positionally shifted, thereby facilitating implementation. This offset may be adjusted by using a functional material such as a liquid crystal to change the dielectric constant of a substrate where the elements are arranged or using an additional element such as lens.

The sensor elements (transmitting elements and receiving elements) are not required to be arranged along a straight line, but may be arranged on a plane or along a circle arc.

In the aforementioned design methods, the relative spatial arrangement between the transmitting element and the receiving element is not fixed. Therefore, the aforementioned design methods are not limited to the arrangement of elements of the detection and ranging apparatus, but may be used for designing a device using a plurality of sensors (antennas for radio) for transmitting and receiving, for example, an MIMO (Multi Input Multi Output) communication system illustrated in FIG. 20.

Figure 20:
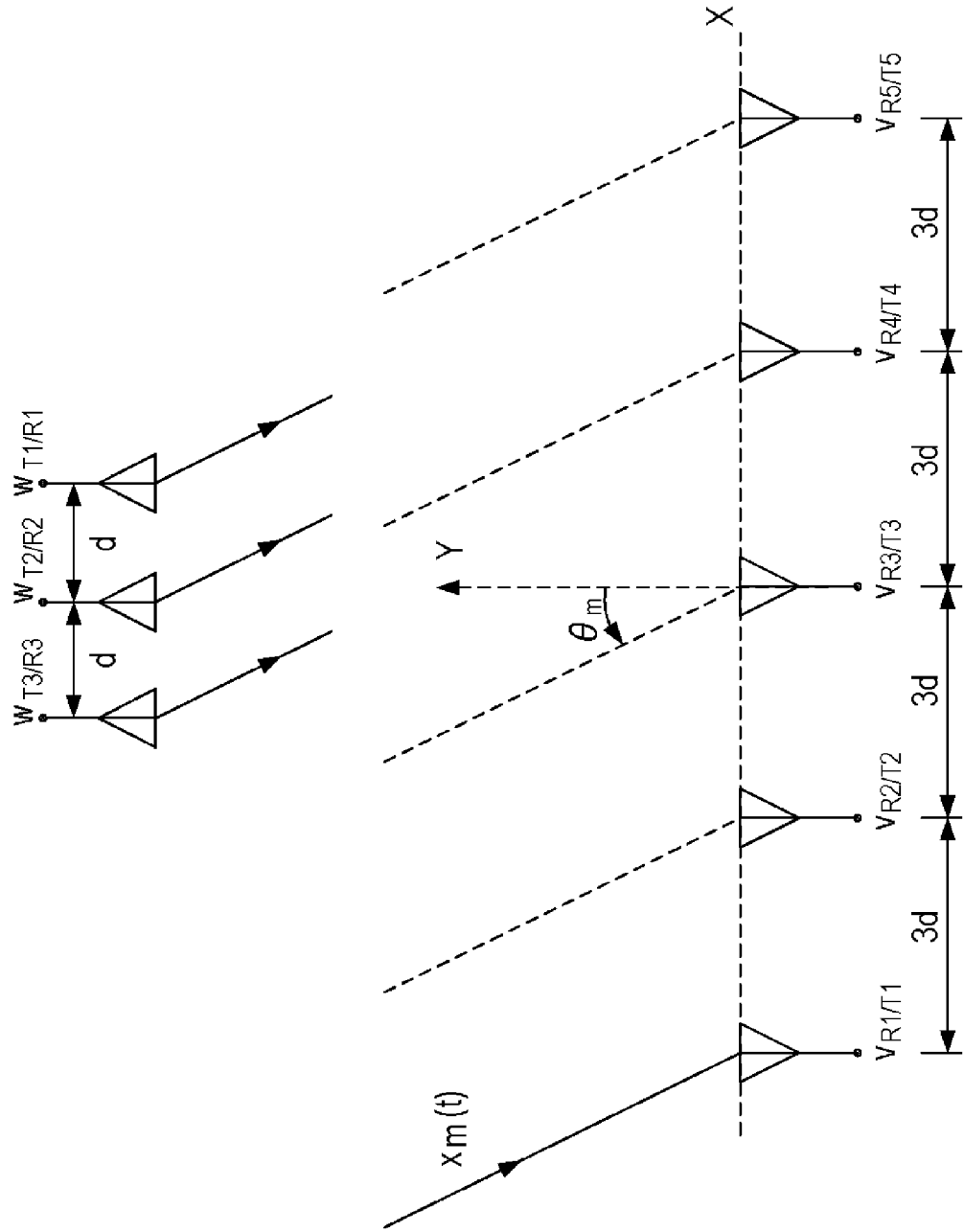
FIG. 20 illustrates an embodiment of an MIMO system.

For example, FIG. 20 illustrates an antenna arrangement of an MIMO communication system determined by applying an embodiment of the present invention. This communication system includes three antenna elements $W_{T1/R1}$ to $W_{T3/R3}$ having a transmitting/receiving function spaced apart at a distance d, and five antenna elements $V_{T1/R1}$ $V_{T5/R5}$ having a transmitting/receiving function spaced apart at a distance 3d. When the antenna elements $W_{T1}$ to $W_{T3}$ perform transmission and the antenna elements $V_{R1}$ to $V_{R5}$ perform receiving, the array factor f of the transmitting array is expressed by the expression (46), and the array factor g of the receiving array is expressed by the expression (47).

$$f(z; r, p) = 1 + z + z^2 = \sum_{m=0}^{2} z^m = \frac{1-z^3}{1-z} \quad (46)$$

$$g(z; s, q) = 1 + z^3 + z^6 + z^9 + z^{12} = \sum_{n=0}^{4} z^{3n} = \frac{1-z^{15}}{1-z^3} \quad (47)$$

Therefore, the array factor h of the receiving sensor array after holographic synthesis is expressed by the expression (48).

$$\begin{aligned} h(z; u) &= f(z; r, p)g(z; s, q) \\ &= \frac{1-z^3}{1-z}\frac{1-z^{15}}{1-z^3} \\ &= \frac{1-z^{15}}{1-z} \\ &= \sum_{k=0}^{15} z^k \end{aligned} \quad (48)$$

Thus, the configuration may provide an MIMO system equivalent to the receiving sensor array where 15 sensor elements are equally spaced. FIG. 21 illustrates the mixed phases provided by the MIMO system illustrated in FIG. 20.

The antenna system of the embodiment may preferably be designed not only for the radar device but also for a device having a limited size. For example, when the antenna elements $W_{T1/R1}$ to $W_{T3/R3}$ illustrated in FIG. 20 are mounted on the tag portion of a small sized RFID and the antenna elements $V_{T1/R1}$ to $V_{T5/R5}$ are mounted on a reader portion of the RFID with enough room, an equivalently sized aperture area may be provided and system gain may be increased.

As described above, according to the disclosed method, when a desired polynomial equation representing a desired characteristic is inputted, the desired polynomial equation is decomposed to determine the arrangement of an M number of transmitting elements and the arrangement of an N number of receiving elements. Consequently, the disclosed method facilitates designing a detection and ranging apparatus having a plurality of sensor elements.

Moreover, in the disclosed configuration, a sensor array having an M×N number of receiving elements may be equivalently implemented by using an M+N number of elements (the number of elements in the case of using transmitting/receiving shared elements is max(M, N), but hereinafter is not noted unless ambiguous). In addition, one of the distances between the sensor element is αd and one of the distances between the sensor element distances is βd (where, α+β=1), thereby allowing the size of the detection and ranging apparatus to be reduced. When sensors are arranged along the same line, an array of M×N number of equivalent sensors may be a practical and desirable equivalent sensor array configuration. Consequently, the disclosed configuration may provide a compact detection and ranging apparatus with high detection accuracy.

Therefore, the embodiments described above may facilitate designing a detection and ranging apparatus having a plurality of sensor elements. And the embodiments described above may allow for the miniaturization of a detection and ranging apparatus having desirable detection accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of designing a detection and ranging apparatus having an M number of transmitting elements and an N number of receiving elements, said method implemented on at least one computer, the method comprising:
   decomposing a desired polynomial equation representing an array factor of a K element sensor array into a first polynomial equation representing an array factor of an M element sensor array and a second polynomial equation representing an array factor of an N element sensor array;
   determining arrangement of the M number of transmitting elements based on the first polynomial equation; and
   determining arrangement the N number of receiving elements based on the second polynomial equation, wherein $K=M \times N$, or $K \geq \max(M, N)$.

2. The method of designing the detection and ranging apparatus according to claim 1, wherein the desired polynomial equation is expressed as $$\sum_{k=0}^{K-1} z^k,$$

wherein $z=\exp(-j2\pi(d/\lambda)\sin(\theta))$,
   j: Imaginary unit,
   d: Standard sensor distance,
   $\lambda$: Wavelength of a carrier signal, and
   $\theta$: Variable representing an arbitrary angle within a measurement range.

3. The method of designing the detection and ranging apparatus according to claim 2, wherein
   an element $z^m$, where m is an integer, of the first polynomial equation corresponds to each transmitting element of the M number of transmitting elements;
   the M number of transmitting elements are arranged so as to provide a distance of $m \times d$ between the transmitting element corresponding to $z^0$ and the transmitting element corresponding to $z^m$ according to the first polynomial equation;
   an element $z^n$, where n is an integer, of the second polynomial equation corresponds to each receiving element of the N number of receiving elements; and
   the N number of receiving elements are arranged so as to provide a distance of $n \times d$ between the receiving element corresponding to $z^0$ and the receiving element corresponding to $z^n$ according to the second polynomial equation.

4. The method of designing the detection and ranging apparatus according to claim 1, wherein
   a distance between a first transmitting element of the M number of transmitting elements and any one receiving element of the N number of receiving elements is $\beta d$;
   a distance between a second transmitting element of the M number of transmitting elements and any one receiving element of the N number of receiving elements is $\beta d$; and
   a distance between other mutually adjacent elements is d or an integral multiple of d, wherein $\alpha+\beta=1$.

5. The method of designing the detection and ranging apparatus according to claim 1, wherein
   a distance between a first receiving element of the N number of receiving elements and any one transmitting element of the M number of transmitting elements is $\beta d$;
   a distance between a second receiving element of the N number of receiving elements and any one transmitting element of the M number of transmitting elements is $\beta d$; and
   a distance between other mutually adjacent elements is d or an integral multiple of d, wherein $\alpha+\beta=1$.

6. A computer readable recording medium that records a program for designing a detection and ranging apparatus having an M number of transmitting elements and an N number of receiving elements, the program causing a computer to execute:
   a procedure for decomposing a desired polynomial equation representing an array factor of a K element sensor array into a first polynomial equation representing an array factor of an M element sensor array and a second polynomial equation representing an array factor of an N element sensor array;
   a procedure for determining arrangement of the M number of transmitting elements based on the first polynomial equation; and
   determining arrangement of the N number of receiving elements based on the second polynomial equation, wherein $K=M \times N$, or $K \geq \max(M, N)$.

7. A detection and ranging apparatus comprising:
   an M number of transmitting elements transmitting a probe signal;
   an N number of receiving elements receiving an echo signal from an object; and
   a calculation unit calculating a direction where the object is located using output signals of the N number of receiving elements,
   wherein a distance between a first transmitting element of the M number of transmitting elements and any one receiving element of the N number of receiving elements is $\beta d$;
   a distance between a second transmitting element of the M number of transmitting elements and any one receiving element of the N number of receiving elements is $\beta d$; and
   a distance between other mutually adjacent elements is d or an integral multiple of d, wherein $\alpha+\beta=1$.

8. The detection and ranging apparatus according to claim 7, wherein
   the N number of receiving elements are spaced apart at a distance d to configure a receiving element array;
   an $L_1$ number of transmitting elements including the first transmitting element are arranged outside one of the receiving element arrays; and
   an $L_2$ number of transmitting elements including the second transmitting element are arranged outside the other one of the receiving element arrays, wherein $L_1+L_2=M$.

9. The detection and ranging apparatus according to claim 7, wherein
   the N number of receiving elements are each spaced apart by a distance d; and the M number of transmitting elements are each spaced apart by N×d.

10. The detection and ranging apparatus according to claim 9, wherein
one of the N number of receiving elements is arranged between the first transmitting element and the second transmitting element.

11. The detection and ranging apparatus according to claim 7, wherein
the M number of transmitting elements and the N number of receiving elements are provided as a plurality of sensor elements including a transmitting and receiving shared element.

12. A detection and ranging apparatus comprising:
an M number of transmitting elements transmitting a probe signal;
an N number of receiving elements receiving an echo signal form an object; and
a calculation unit calculating a direction where the object is located using output signals of the N number of receiving elements,
wherein a distance between a first receiving element of the N number of receiving elements and any one transmitting element of the M number of transmitting elements is $\beta d$;
a distance between a second receiving element of the N number of receiving elements and any one transmitting element of the M number of transmitting elements is $\beta d$; and
a distance between other mutually adjacent elements is d or an integral multiple of d, wherein $\alpha+\beta=1$.

13. The detection and ranging apparatus according to claim 12, wherein the M number of transmitting elements are each spaced apart at a distance d to configure a transmitting element array;
an $L_1$ number of receiving elements including the first receiving element are arranged outside one of the transmitting element arrays; and
an $L_2$ number of receiving elements including the second receiving element are arranged outside the other one of the transmitting element arrays, wherein $L_1+L_2=N$.

14. The detection and ranging apparatus according to claim 12, wherein
the M number of transmitting elements are each spaced apart by a distance d; and
the N number of receiving elements are each spaced apart by M×d.

15. The detection and ranging apparatus according to claim 14, wherein
one of the N number of receiving elements is arranged between the first transmitting element and the second transmitting element.

16. The detection and ranging apparatus according to claim 12, wherein the M number of transmitting elements and the N number of receiving elements are provided as a plurality of sensor elements including a transmitting and receiving shared element.

* * * * *

UNITED STATES PATENT AND TRADEMARK OFFICE
CERTIFICATE OF CORRECTION

PATENT NO. : 8,009,083 B2  Page 1 of 1
APPLICATION NO. : 12/642469
DATED : August 30, 2011
INVENTOR(S) : Kazuo Shirakawa It is certified that error appears in the above-identified patent and that said Letters Patent is hereby corrected as shown below:

Column 25, Line 67, In Claim 4, delete "βd;" and insert --αd;--, therefor.

Column 26, Line 11 (Approx.), In Claim 5, delete "βd;" and insert --αd;--, therefor.

Column 26, Line 47, In Claim 7, delete "βd;" and insert --αd;--, therefor.

Column 27, Line 25 (Approx.), In Claim 12, delete "βd;" and insert --αd;--, therefor.

Signed and Sealed this
Eighth Day of November, 2011

David J. Kappos
*Director of the United States Patent and Trademark Office*